(12) United States Patent
Iijima et al.

(10) Patent No.: US 8,212,912 B2
(45) Date of Patent: Jul. 3, 2012

(54) IMAGING DEVICE, IMAGING SYSTEM, AND IMAGING METHOD

(75) Inventors: Tomokuni Iijima, Kanagawa (JP); Satoshi Tamaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 315 days.

(21) Appl. No.: 12/598,292

(22) PCT Filed: Apr. 7, 2009

(86) PCT No.: PCT/JP2009/001598
§ 371 (c)(1),
(2), (4) Date: Oct. 30, 2009

(87) PCT Pub. No.: WO2009/125577
PCT Pub. Date: Oct. 15, 2009

(65) Prior Publication Data
US 2010/0128140 A1 May 27, 2010

(30) Foreign Application Priority Data
Apr. 10, 2008 (JP) ................................. 2008-102874

(51) Int. Cl.
*H04N 5/225* (2006.01)
(52) U.S. Cl. ....................................................... 348/335
(58) Field of Classification Search ............... 348/222.1, 348/263, 265, 335
See application file for complete search history.

(56) References Cited

U.S. PATENT DOCUMENTS

| 2002/0122124 A1* | 9/2002 | Suda .............................. 348/263 |
| 2003/0086013 A1* | 5/2003 | Aratani ......................... 348/335 |
| 2006/0001765 A1 | 1/2006 | Suda |
| 2009/0085873 A1* | 4/2009 | Betts et al. .................... 345/169 |

FOREIGN PATENT DOCUMENTS

| JP | 2002-204462 | 7/2002 |
| JP | 2003-143459 | 5/2003 |
| JP | 2007-271301 | 10/2007 |

* cited by examiner

*Primary Examiner* — Tuan Ho
*Assistant Examiner* — Akshay Trehan
(74) *Attorney, Agent, or Firm* — Wenderoth, Lind & Ponack L.L.P.

(57) ABSTRACT

The number of thermal sensors in an imaging device that requires temperature measurement is reduced. The imaging device includes: a lens array (112) including lenses; an imaging element (122) provided at a predetermined distance from the lens array (112) and having imaging areas respectively corresponding to the lenses; a light-shielding wall (113) which partitions a space between the lens array and the imaging element so as to prevent light entering each of the lenses from reaching the imaging areas different from a corresponding one of the imaging areas; an imaging signal input unit (133) configured to generate an imaging signal by digitalizing an electric signal provided by the imaging element; and a temperature estimation unit (143) configured to calculate, from the imaging signal, a length of an image of the light-shielding wall projected on an imaging plane of the imaging element, and to estimate a temperature using the calculated length of the image of the light-shielding wall.

10 Claims, 30 Drawing Sheets

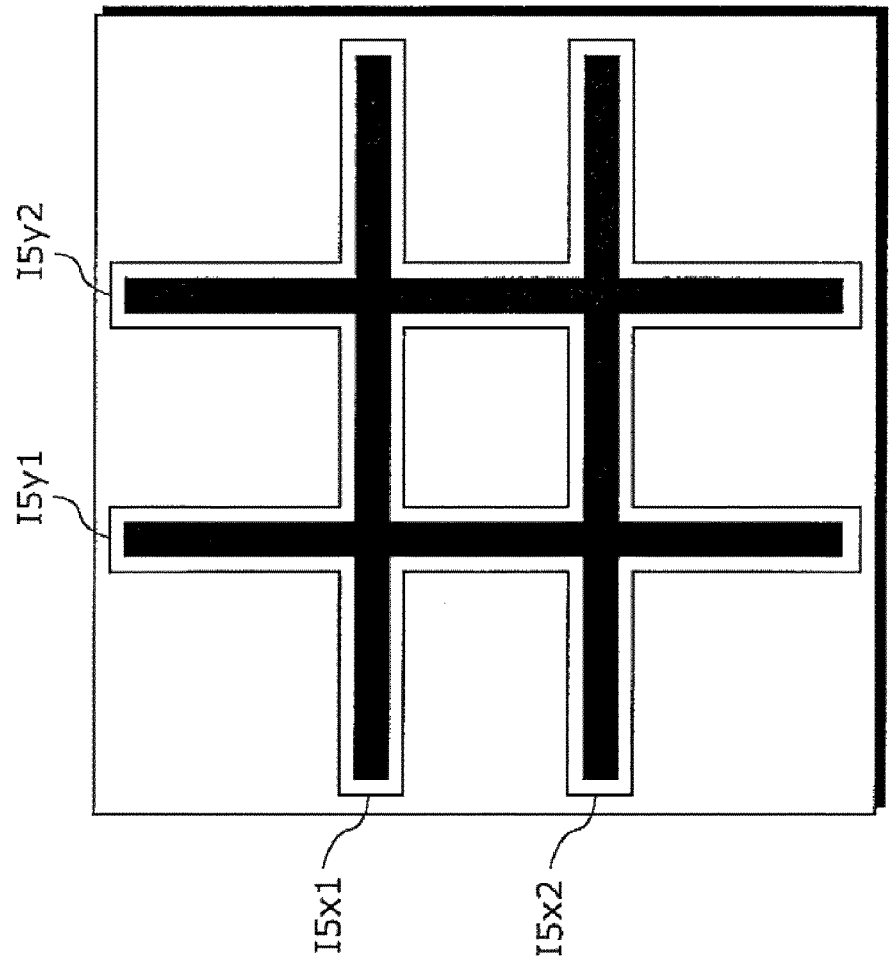
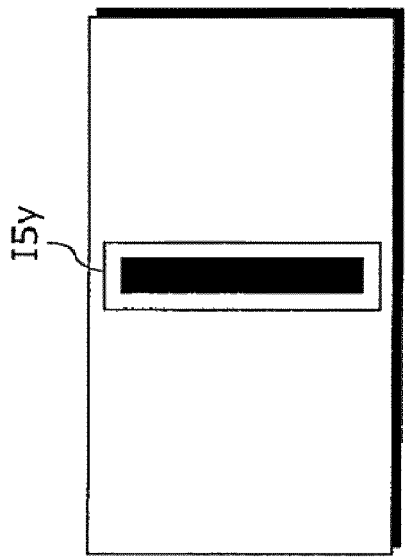

US 8,212,912 B2

IMAGING DEVICE, IMAGING SYSTEM, AND IMAGING METHOD

TECHNICAL FIELD

The present invention relates to a miniaturized and high-precision imaging device, and in particular to an imaging device having a plurality of lenses.

BACKGROUND ART

One of conventional imaging devices is an imaging device having a lens array in which a plurality of lenses is integrally formed (see Patent Literature 1, for example). Hereinafter, an imaging device of Patent Literature 1 is described with reference to FIGS. 30 and 31.

FIG. 30 is an exploded perspective view of an imaging device 901 of Patent Literature 1. FIG. 31 is an explanatory diagram of imaging blocks of the imaging device 901 of Patent Literature 1.

As shown in FIGS. 30 and 31, the imaging device 901 includes an aperture member 902, an optical block array 903, a light-shielding block 904, an optical filter 906, an imaging unit 907, a driving circuit 908, a disparity calculation circuit 909, and a semiconductor substrate 910

The aperture member 902 is a member which adjusts the amount of light entering the optical block array 903, and includes plural openings 902a, 902b, 902c, and 902d.

The optical block array 903 is what is known as lens array, and is a member on which plural optical blocks 903a, 903b, 903c, and 903d are integrally formed. Here, the optical axes of the plural optical blocks 903a, 903b, 903c, and 903d are approximately parallel with one another. Each of the optical blocks 903a, 903b, 903c, and 903d is provided in correspondence with one of the openings 902a, 902b, 902c, and 902d of the aperture member 902:

The light-shielding block 904 is a member which prevents the light entering each opening of the aperture member 902 from reaching the image blocks other than the corresponding imaging block.

The optical filter 906 is a member which includes an optical low-pass filter and an infrared cut filter, for example.

The imaging unit 907 is a solid-state imaging element such as a CCD sensor or a CMOS sensor, and includes imaging blocks 907a, 907b, 907c, and 907d corresponding to the optical blocks 903a, 903b, 903c, and 903d of the optical block array 903, respectively.

The driving circuit 908 is a circuit provided on the semiconductor substrate 910, and drives the imaging unit 907.

The disparity calculation circuit 909 is a circuit for calculating a disparity between images formed on the imaging blocks.

The semiconductor substrate 910 is a substrate on which the imaging unit 907, the driving circuit 908, the disparity calculation circuit 909 and so on are disposed.

The light passing through the openings 902a, 902b, 902c, and 902d of the aperture member 902 is refracted by the optical blocks 903a, 903b, 903c, and 903d, and then passes through the light-shielding block 904 and the optical filter 906 to form an image on the imaging blocks 907a, 907b, 907c, and 907d.

Then, the distance between the imaging device 901 and the object is calculated by calculating a disparity between the images obtained from the imaging blocks. For example, the disparity calculation circuit 909 performs a block matching operation to calculate the degree of similarity in blocks between the image obtained from the imaging block 907a and the image obtained from the imaging block 907b. Subsequently, the disparity calculation circuit 909 calculates a disparity d based on the degree of similarity calculated. After that, the disparity calculation circuit 909 calculates a distance L from the disparity d, using Equation (1).

[Math. 1]

$$L = \frac{fB}{pd} \tag{1}$$

Here, f denotes the focal length of the optical blocks 903a and 903b. Further, B denotes a spacing between the optical axis of the optical block 903a and the optical axis of the optical block 903b. Furthermore, p denotes a pixel spacing of the imaging unit 907 in the direction connecting the optical axes of the optical blocks 903a and 903b.

In this manner, the imaging device 901 having the optical block array 903 calculates the distance to the object. However, the optical block array 903 changes its shape as the temperature varies. That is to say, there is a problem of a greater error in the distance calculated using Equation (1), because temperature variation causes a change in the spacing between the optical axes.

In view of the problem, an imaging device has conventionally been proposed which includes a thermal sensor for detecting temperature, so that the distance measuring precision is increased using the detected temperature (see Patent Literature 2, for example). The following describes how the distance measuring precision is increased when the imaging device 901 shown in FIGS. 30 and 31 has a thermal sensor.

When the temperature detected by the thermal sensor of the imaging device 901 is assumed as a detected temperature T, an amount of change z in the distance between the optical axes is calculated using Equation (2).

[Math. 2]

$$z = B(aL - aS)(T - T0) \tag{2}$$

Here, aL denotes a linear thermal expansion coefficient of the optical block array, and aS denotes a linear thermal expansion coefficient of the imaging unit. Further, T0 denotes a reference temperature, and B denotes a distance between the optical axes of the optical blocks at the reference temperature T0.

Using the amount of change z in the distance between the optical axes, which is calculated in the above manner, the imaging device corrects the images obtained from the imaging blocks.

To be more specific, in the case where an image I1 obtained from the imaging block 907a is used as a reference as shown in Equation (3), the imaging device corrects images I2, I3, and I4 obtained from the imaging blocks 907b, 907c, and 907d, by using Equations (4), (5), and (6), respectively.

It is to be noted that the optical axis of the optical block 903a and that of the optical block 903b are x-axially distant from each other by a distance B. Likewise, the optical axis of the optical block 903c and that of the optical block 903d are x-axially distant from each other by the distance B. Further, the optical axis of the optical block 903a and that of the optical block 903c are y-axially distant from each other by the distance B. Likewise, the optical axis of the optical block 903b and that of the optical block 903d are y-axially distant from each other by the distance B.

[Math. 3]

$$I1(x, y) = I1(x, y) \quad (3)$$

$$I2(x, y) = I2\left(x + \frac{z}{p}, y\right) \quad (4)$$

$$I3(x, y) = I3\left(x, y + \frac{z}{p}\right) \quad (5)$$

$$I4(x, y) = I4\left(x + \frac{z}{p}, y + \frac{z}{p}\right) \quad (6)$$

Here, p denotes x- and y-axial pixel spacings of the imaging unit 907. Further, I1 (x, y), I2 (x, y), I3 (x, y), and I4 (x, y) denote image luminance at coordinates (x, y) before and after correction.

A temperature variation causes the optical block 903b to shift x-axially by z/p pixel(s) with respect to the optical block 903a. Thus, the imaging device corrects I2 (x, y) as shown in Equation (4) so that the image shifts x-axially by z/p pixel(s).

Further, a temperature variation causes the optical block 903c to shift y-axially by zip pixel(s) with respect to the optical block 903a. Thus, the imaging device corrects I3 (x, y) as shown in Equation (5) so that the image shifts y-axially by z/p pixel(s).

Furthermore, a temperature variation causes the optical block 903d to shift by z/p pixel(s) both x-axially and y-axially with respect to the optical block 903a. Thus, the imaging device corrects I4 (x, y) as shown in Equation (6) so that the image shifts by z/p pixel(s) both x-axially and y-axially.

Calculation of the distance to the object using such corrected images leads to increase in the distance measuring precision of the imaging device.

[Citation List]
[Patent Literature]
[Patent Literature 1]
Japanese Unexamined Patent Application Publication No. 2003-143459
[Patent Literature 2]
Japanese Unexamined Patent Application Publication No. 2002-204462

SUMMARY OF INVENTION

Technical Problem

The above conventional imaging device, however, needs the thermal sensor in order to obtain the temperature of the lens array and the imaging element. Further, plural thermal sensors are needed in order to increase the reliability in the detection of the temperature of the lens array and the imaging element. Consequently, mounting the thermal sensors creates a problem of increasing the number of components of the imaging device and thus increasing the manufacturing cost.

In view of the problem, it is an object of the present invention to reduce the number of thermal sensors in an imaging device that requires temperature measurement.

Solution to Problem

In order to achieve the above object, the imaging device according to an aspect of the present invention is an imaging device for taking an image of an object, the imaging device including: a lens array including a plurality of lenses; an imaging element provided at a predetermined distance from the lens array and having a plurality of imaging areas respectively corresponding to the plurality of lenses; a light-shielding wall which partitions a space between the lens array and the imaging element so as to prevent light entering each of the plurality of lenses from reaching the plurality of imaging areas different from a corresponding one of the plurality of imaging areas; an imaging signal input unit configured to generate an imaging signal by digitalizing an electric signal provided by the imaging element; and a temperature estimation unit configured to calculate, from the imaging signal, a length of an image of the light-shielding wall projected on an imaging plane of the imaging element, and to estimate a first temperature using the calculated length of the image of the light-shielding wall.

This makes it possible to estimate the temperature using the light-shielding wall, which is usually included in an imaging device having a lens array. In other words, the imaging device according to an aspect of the present invention can measure the temperature without a thermal sensor for detecting the temperature.

Moreover, the imaging device may further include: a thermal sensor which is provided near the lens array and detects a second temperature; and a reliability calculation unit configured to calculate a reliability value of the second temperature based on the first temperature and the second temperature. To be more specific, the reliability calculation unit may be configured to calculate the reliability value such that a reliability of the second temperature is lower when a difference between the first temperature and the second temperature is larger.

This allows comparison between the temperature estimated using the light-shielding wall and the temperature detected by the thermal sensor, thereby making it possible to evaluate the reliability of the temperature detected by the thermal sensor. As a result, providing a notification to the outside when the reliability is low, for example, leads to increased reliability of the imaging device. That is to say, the imaging device, the reliability of which would conventionally need to be increased by adding another thermal sensor, can provide higher reliability without an additional thermal sensor.

Furthermore, the imaging device may further include: a temperature compensation operation unit configured to estimate an amount of change in distance between optical axes of the plurality of lenses caused by a change in temperature from a predetermined temperature to the second temperature, and to correct, using the estimated amount of change, data obtained from the imaging signal; and a distance calculation unit configured to calculate a disparity between images taken on the plurality of imaging areas, and a distance to the object using the data corrected by the temperature compensation operation unit.

This makes it possible to calculate the distance with consideration of the reliability of the temperature obtained by the thermal sensor. That is to say, a highly-reliable distance measuring device can be provided.

In addition, the imaging device may further include a notification unit configured to generate notification data for external notification when a reliability of the second temperature is determined to be low because the reliability value calculated by the reliability calculation unit exceeds a predetermined value.

With this structure, when the reliability value of the measured temperature is below the predetermined value, it is possible to provide a notification about such a situation.

Moreover, the imaging device may further include a lens tube of a tubular shape provided between the lens array and the imaging element to surround the light-shielding wall, wherein the lens tube may include at least a pair of grooves in an inner surface, wherein the light-shielding wall may be a platy member of a rectangular shape extending in a direction from the imaging plane of the imaging element to the lens array, and include side edges fitted into the grooves of the lens tube so as to set the light-shielding wall in place, and at least two protruding portions protruding from a same plate surface of the platy member, and wherein the temperature estimation unit may be configured to estimate the first temperature using a length of an image between the protruding portions.

Furthermore, the imaging device may further include a lens tube of a tubular shape provided between the lens array and the imaging element to surround the light-shielding wall, wherein the lens tube may include at least a pair of grooves in an inner surface, wherein the light-shielding wall may be a platy member extending in a direction from the imaging plane of the imaging element to the lens array, and include a first plate portion having side edges fitted into the grooves of the lens tube, and a second plate portion protruding from the first plate portion toward the imaging plane, and wherein the temperature estimation unit may be configured to estimate the first temperature using a length of an image of the second plate portion.

With such structures, it is possible to stably provide the light-shielding wall and increase the precision in calculating the length of the image of the light-shielding wall projected on the imaging plane, thereby enabling the temperature estimation with higher precision.

Further, the imaging system according to an aspect of the present invention includes: the imaging device; and a system control unit configured to perform predetermined control based on the distance to the object and the reliability value which are calculated by the imaging device.

With this, the imaging system produces the same advantageous effect as that of the imaging device according to an aspect of the present invention.

In addition, the imaging method according to an aspect of the present invention is an imaging method for use in an imaging device, wherein the imaging device includes: a lens array including a plurality of lenses; an imaging element provided at a predetermined distance from the lens array and having a plurality of imaging areas respectively corresponding to the plurality of lenses; and a light-shielding wall which partitions a space between the lens array and the imaging element so as to prevent light entering each of the plurality of lenses from reaching the plurality of imaging areas different from a corresponding one of the plurality of imaging areas, and the imaging method includes: generating an imaging signal by digitalizing an electric signal provided by the imaging element; and calculating, from the imaging signal, a length of an image of the light-shielding wall projected on an imaging plane of the imaging element, and estimating a temperature using the calculated length of the image of the light-shielding wall.

With this, the imaging method also produces the same advantageous effect as that of the imaging device according to an aspect of the present invention.

It is to be noted that the present invention can be realized also as a program that causes execution of steps of such an imaging method. Such a program can be distributed via a storage medium such as a Compact Disc-Read Only Memory (CD-ROM) or a communication network such as the Internet.

Advantageous Effects of Invention

The present invention makes it possible to reduce the number of thermal sensors in an imaging device that requires temperature measurement.

BRIEF DESCRIPTION OF DRAWINGS

FIG. 29A shows an imaging signal of a light-shielding wall according to an aspect of the present invention.

FIG. 29B shows imaging signals of a light-shielding wall according to an aspect of the present invention.

DESCRIPTION OF EMBODIMENTS

Hereinafter, an imaging device according to embodiments of the present invention is described with reference to the drawings.

(Embodiment 1)

An imaging device according to Embodiment 1 of the present invention is characterized in calculating an amount of temperature-caused change in image of a light-shielding wall projected on an imaging plane of an imaging element, and estimating a temperature using the calculated amount of change.

Hereinafter, the imaging device according to Embodiment 1 of the present invention is described with reference to the drawings.

Figure 1:
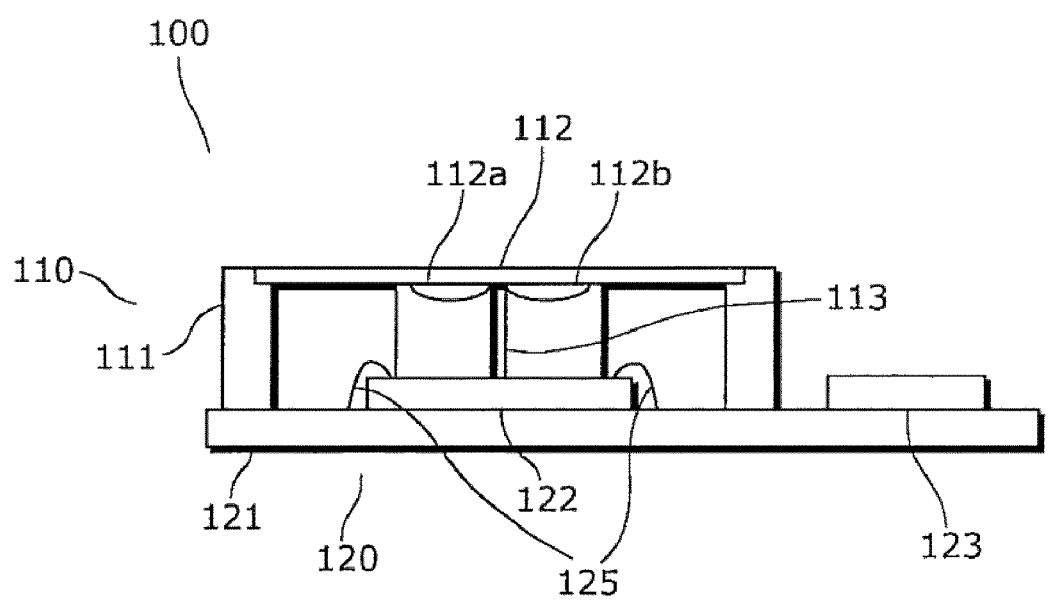
FIG. 1 is a sectional view showing the structure of an imaging device according to Embodiment 1 of the present invention.
Figure 2:
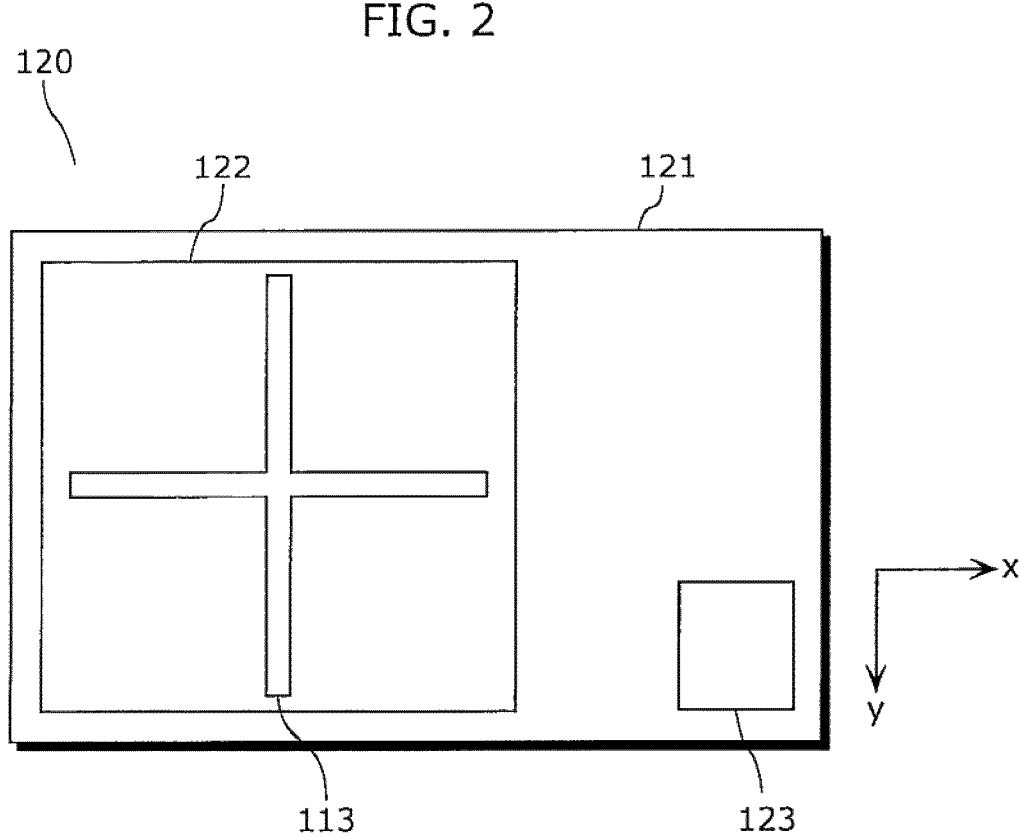
FIG. 2 is a plan view of an imaging device according to Embodiment 1 of the present invention, in a state where a lens tube and a lens array are removed.

FIG. 1 is a sectional view showing the structure of an imaging device 100 according to Embodiment 1 of the present invention. FIG. 2 is a plan view of the imaging device 100 according to Embodiment 1 of the present invention; in a state where a lens tube 111 and a lens array 112 are removed.

As shown in FIGS. 1 and 2, the imaging device 100 includes a lens module 110 and a circuit unit 120. The lens module 110 includes the lens tube 111, the lens array 112, and a light-shielding wall 113. The circuit unit 120 includes a substrate 121, an imaging element 122, and a system LSI (hereinafter referred to as SLSI) 123. Hereinafter, each constituent element is described in detail.

The lens tube 111 is a rectangularly cuboidal member of a tubular shape formed in one piece with a resin. The lens tube 111 is disposed at a position surrounding the outer edges of the lens array 112 and of the imaging element 122. The inner surface of the lens tube 111 is matte black in order to prevent light diffusion.

The lens array 112 is made of glass, a transparent resin or the like, and includes a first lens 112a, a second lens 112b, a third lens 112c, and a fourth lens 112d. The lens array 112 is bonded to the upper portion of the inner surface of the lens tube 111 using an adhesive, for example. The lens array 112 is described later in detail with reference to FIG. 3.

The light-shielding wall 113 is a member that partitions the is space between the lens array 112 and the imaging element 122 so as to prevent the light entering each lens of the lens array 112 from reaching imaging areas different from a corresponding imaging area. The light-shielding wall 113 is described later in detail with reference to FIG. 4.

The substrate 121 is a platy member made of a resin. It has components fixed thereon, such as the imaging element 122 and the SLSI 123, and constitutes an electric circuit by connecting such components by a wire. On the upper surface of the substrate 121, the underside of the lens tube 111 is bonded with an adhesive, for example.

The imaging element 122 is a solid-state imaging element such as a Charge Coupled Device (CCD) image sensor or a Complementary Metal Oxide Semiconductor (CMOS) image sensor, and is provided at a predetermined distance from the lens array 112. Further, the imaging element 122 has imaging areas respectively corresponding to the lenses of the lens array 112. The imaging areas are arranged so that each imaging area is approximately perpendicular to the optical axis of the corresponding lens. The imaging element 122 is electrically connected to the SLSI 123 via a gold wire 125 and the substrate 121. The imaging element 122 is described later in detail with reference to FIG. 5.

The SLSI 123 drives the imaging element 122, and obtains an electric signal from the driven imaging element 122. Further, the SLSI 123 estimates a temperature based on the electric signal obtained.

Figure 3:
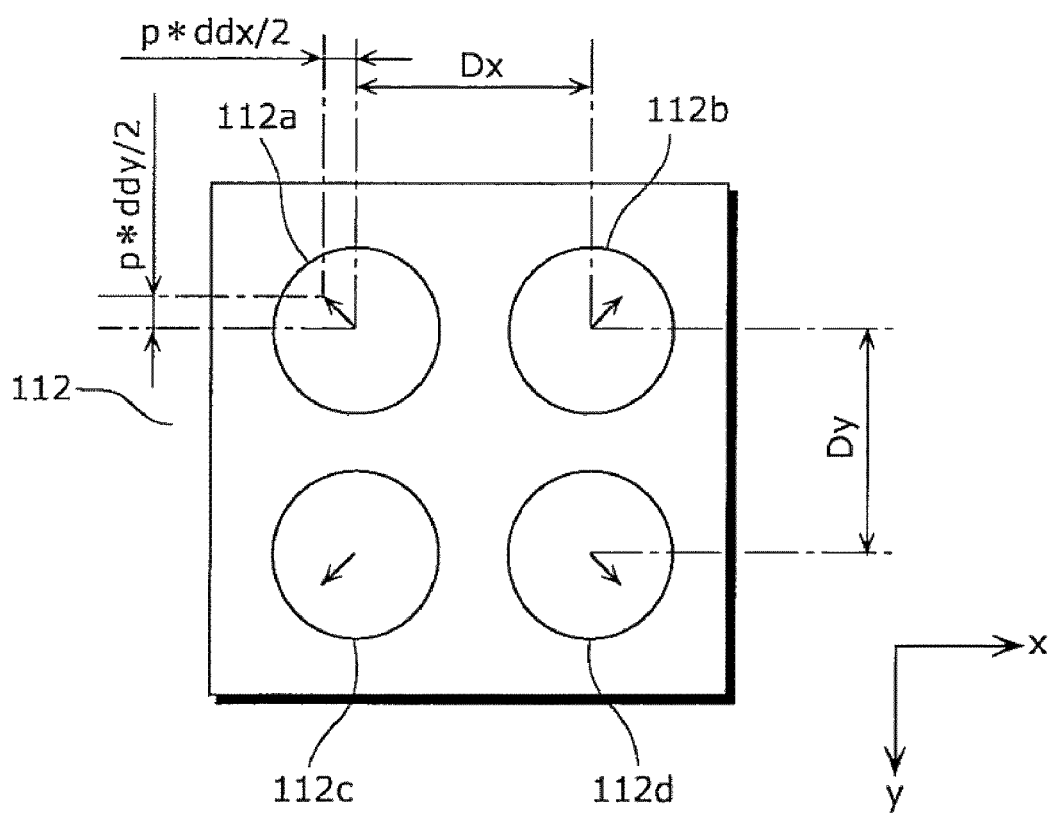
FIG. 3 is a plan view of a lens array included in an imaging device according to an aspect of the present invention.

FIG. 3 is a plan view of the lens array 112 of the imaging device according to an aspect of the present invention.

As shown in FIG. 3, the lens array 112 includes the first lens 112a, the second lens 112b, the third lens 112c, and the fourth lens 112d arranged in a lattice pattern. Here, one direction of the lens arrangement is set as the x-axis, and the other direction as the y-axis.

The optical axes of the four lenses are approximately parallel with one another and approximately perpendicular to the imaging plane of the imaging element 122.

Figure 4:
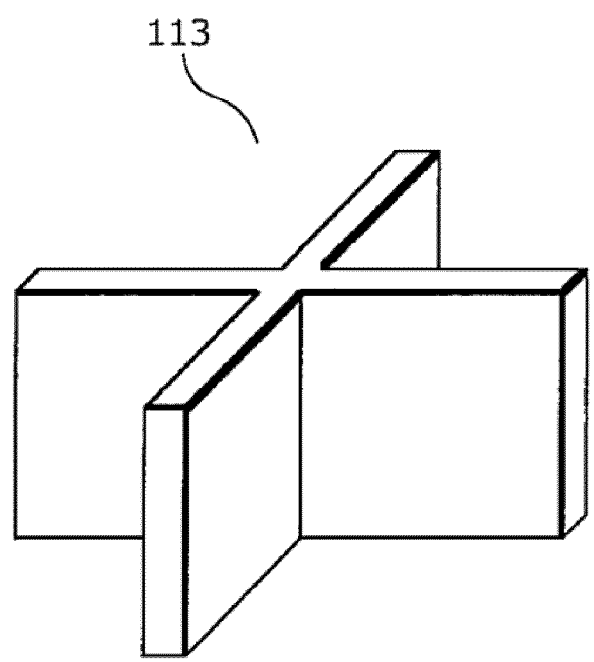
FIG. 4 is a perspective view of a light-shielding wall included in an imaging device according to an aspect of the present invention.

FIG. 4 is a perspective view of the light-shielding wall 113 of the imaging device according to an aspect of the present invention.

As shown in FIG. 4, the light-shielding wall 113 is a member having a shape of two rectangular resin plates assembled crosswise, and is fixed to the underside of the lens array 112 with an adhesive, for example. The surface of the light-shielding wall 113 is matte black in order to prevent light diffusion. The light-shielding wall 113 is formed in one piece through injection-molding of a resin.

Further, the light-shielding wall 113 is provided between the lens array 112 and the imaging element 122 as a partition between the first lens 112a, the second lens 112b, the third lens 112c, and the fourth lens 112d. This way, the light-shielding wall 113 prevents the light entering the lenses from interfering one another.

The light-shielding wall 113 changes its shape as the temperature varies. Generally, the size of a light-shielding wall increases in proportion to temperature within a predetermined temperature range.

It is to be noted that the light-shielding wall 113 may be formed with two pieces of rectangular resin plates, instead of being formed in one piece. In addition, the light-shielding wall 113 is not limited to a resin. That is to say, the light-shielding wall 113 may be made of any material as long as it shields light and changes its shape with temperature variation.

Figure 5:
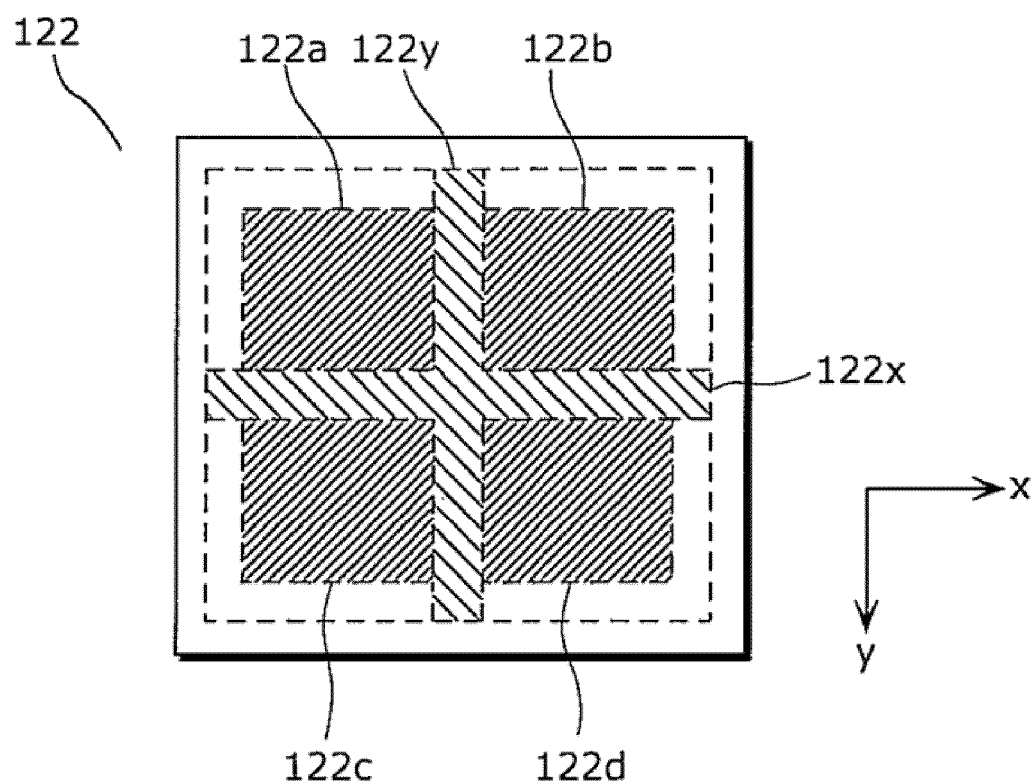
FIG. 5 is a plan view of an imaging element included in an imaging device according to an aspect of the present invention.

FIG. 5 is a plan view of the imaging element 122 included in the imaging device according to an aspect of the present invention.

As shown in FIG. 5, the imaging element 122 includes four imaging areas (a first imaging area 122a, a second imaging area 122b, a third imaging area 122c, and a fourth imaging area 122d) corresponding to the four lenses of the lens array 112 (the first lens 112a, the second lens 112b, the third lens 112c, and the fourth lens 112d).

On each of these imaging areas, an image is formed only with the light from the object entering the corresponding lens. That is to say, the light entering each lens does not reach the imaging areas different from the corresponding imaging area. In other words, the light entering the first lens 112a is incident only on the first imaging area 122a. This is because the light-shielding wall 113 shields the light entering the first lens 112a from being incident on the second, third, and fourth imaging areas.

The imaging element 122 further has a horizontal midsection imaging area 122x and a vertical midsection imaging area 122y, each of which corresponds to the position of the light-shielding wall 113.

Figure 6:
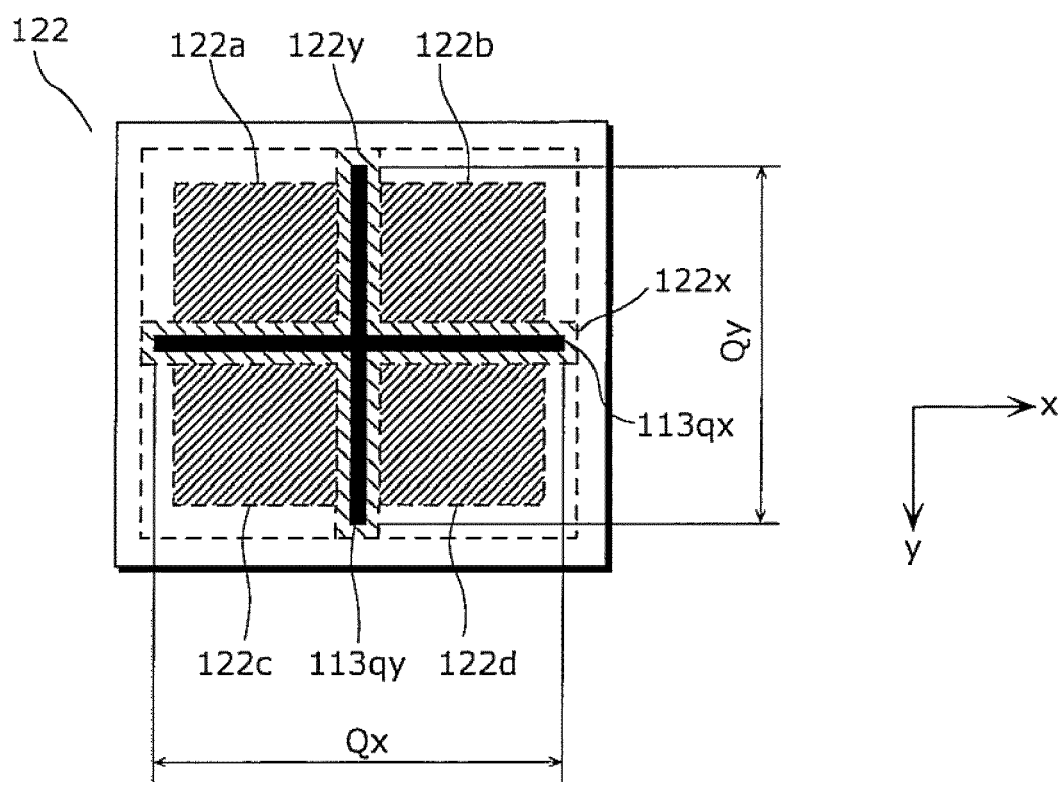
FIG. 6 is an explanatory diagram of an image of a light-shielding wall projected on an imaging element included in an imaging device according to an aspect of the present invention.

FIG. 6 is an explanatory diagram of an image of the light-shielding wall 113 projected on the imaging element 122.

As shown in FIG. 6, the light-shielding wall 113 is projected on the horizontal midsection imaging area 122x and the vertical midsection imaging area 122y of the imaging element 122, as dark sections 113qx and 113qy. The lengths of the dark sections 113qx and 113qy are assumed to be Qx and Qy, respectively.

Figure 7:
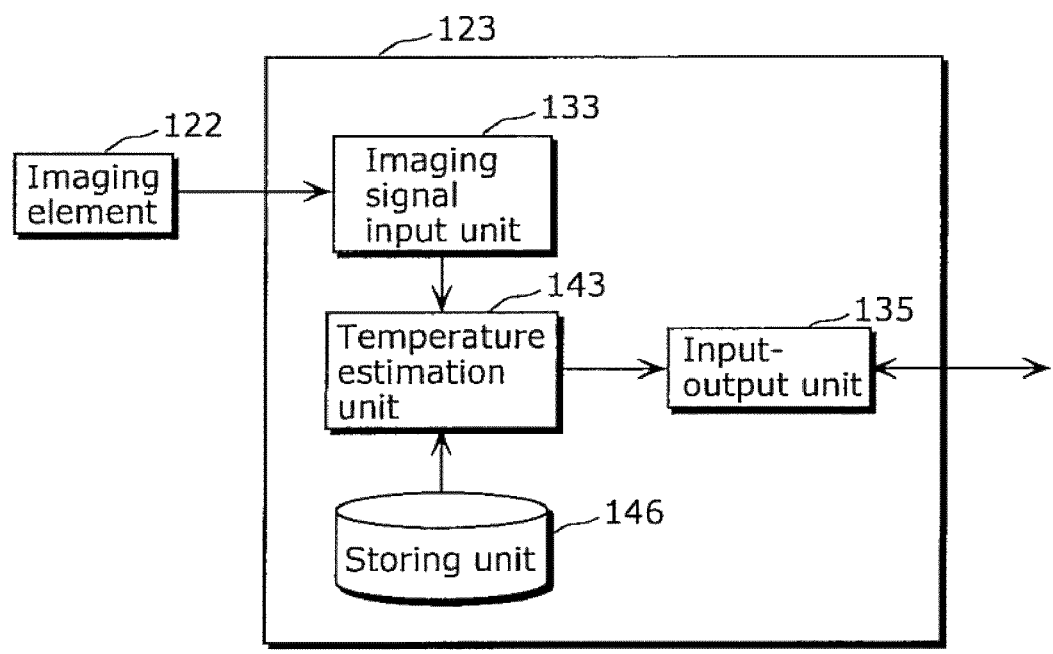
FIG. 7 is a block diagram showing the characteristic functional structure of an imaging device according to Embodiment 1 of the present invention.

FIG. 7 is a block diagram showing the characteristic functional structure of the imaging device 100 according to Embodiment 1 of the present invention.

As shown in FIG. 7, the imaging device 100 includes an imaging signal input unit 133, a temperature estimation unit 143, a storing unit 146, and an input-output unit 135.

The imaging signal input unit 133 includes an analog digital converter (ADC), for example, and generates an imaging signal by digitalizing an electric signal obtained from the imaging element 122.

The temperature estimation unit 143 estimates the temperature of the light-shielding wall 113 by calculating, using the imaging signal generated by the imaging signal input unit 133, the lengths of the image of the light-shielding wall 113 projected on the imaging plane of the imaging element 122.

The storing unit 146 includes a flash memory, for example, and stores the linear thermal expansion coefficient of the light-shielding wall 113 and the lengths of the image of the light-shielding wall 113 projected on the imaging plane of the imaging element 122 at a predetermined temperature. More specifically, the storing unit 146 stores a temperature T0, as well as a linear thermal expansion coefficient kq of the light-shielding wall 113 and an x-axial length Qx0 and a y-axial length Qy0 of the image of the light-shielding wall 113 at the temperature T0.

The input-output unit 135 outputs the temperature estimated by the temperature estimation unit 143. Further, the input-output unit 135 receives an instruction from another device.

Next is a description of the operation of the imaging device 100 having the above structure.

Figure 8:
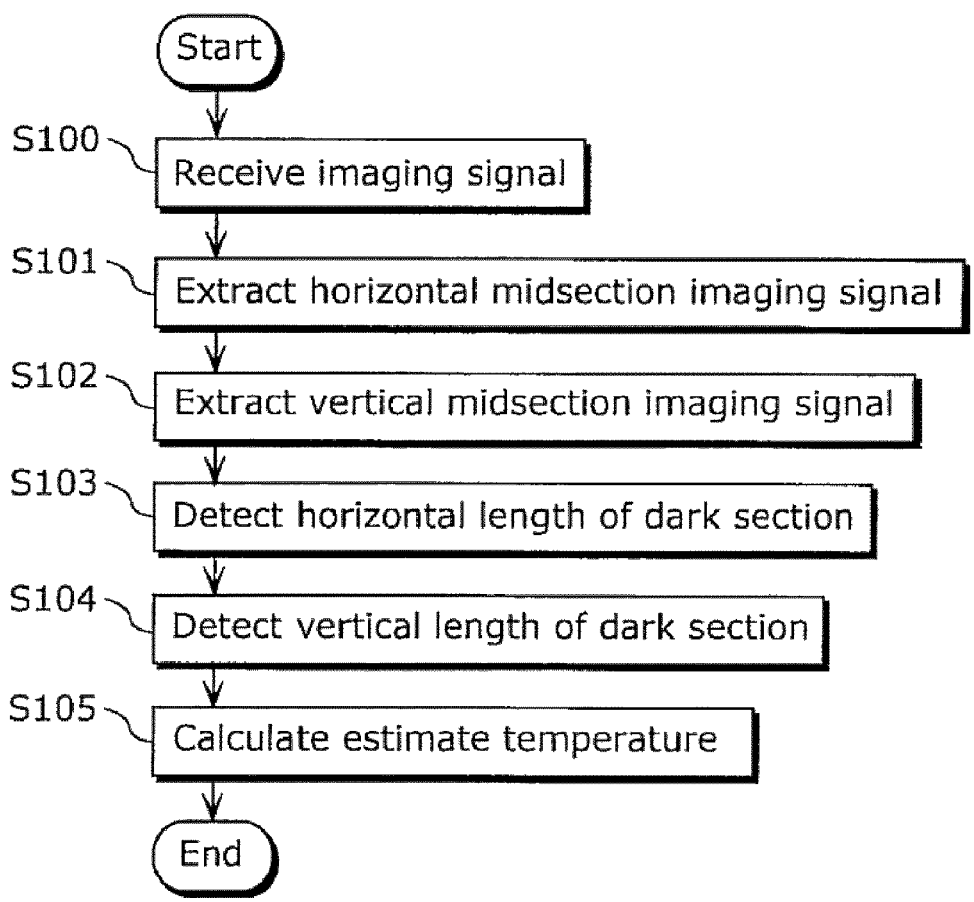
FIG. 8 is a flowchart showing a processing flow related to temperature estimation performed by an imaging device according to Embodiment 1 of the present invention.

FIG. 8 is a flowchart showing a processing flow related to the temperature estimation performed by the imaging device 100 according to Embodiment 1 of the present invention.

Initially, the imaging signal input unit 133 generates an imaging signal by digitalizing an electric signal obtained from the imaging element 122 (Step S100).

Next, the temperature estimation unit 143 extracts, from the imaging signal generated by the imaging signal input unit 133, a horizontal midsection imaging signal corresponding to the horizontal midsection imaging area 122x shown in FIGS. 5 and 6 (Step S101).

Next, the temperature estimation unit 143 extracts, from the imaging signal generated by the imaging signal input unit 133, a vertical midsection imaging signal corresponding to the vertical midsection imaging area 122y shown in FIGS. 5 and 6 (Step S102).

Next, the temperature estimation unit 143 detects, from the extracted horizontal midsection imaging signal, the length of the dark section 113qx, that is, the x-axial length Qx of the image of the light-shielding wall 113 (Step S103). To be more specific, the temperature estimation unit 143 binarizes the horizontal midsection imaging signal, and detects the length Qx from the coordinates of one end and the other end of the dark section using the binarized imaging signal.

Next, as in Step S103, the temperature estimation unit 143 detects, from the vertical midsection imaging signal, the length of the dark section 113qy, that is, the y-axial length Qy of the image of the light-shielding wall 113 (Step S104).

Next, the temperature estimation unit 143 calculates an estimate temperature according to a predefined relational expression by using: the detected lengths Qx and Qy; and the data stored in the storing unit 146, that is, the linear thermal expansion coefficient kq of the light-shielding wall 113 and the x-axial length Qx0 and the y-axial length Qy0 of the image of the light-shielding wall 113 at the temperature T0 (Step S105).

More specifically, the temperature estimation unit 143 calculates temperatures Tx and Ty using Equations (7) and (8) in which temperature-caused change in the light-shielding wall 113 is mathematized. Then, as shown in Equation (9), the temperature estimation unit 143 calculates an arithmetic mean of the temperatures Tx and Ty as an estimate temperature Te.

[Math. 4]

$$Qx = Qx0\{1 + kq(Tx - T0)\} \tag{7}$$

$$Qy = Qy0\{1 + kq(Ty - T0)\} \tag{8}$$

$$Te = \frac{Tx + Ty}{2} = T0 + \frac{1}{2kq}\left(\frac{Qx - Qx0}{Qx0} + \frac{Qy - Qy0}{Qy0}\right) \tag{9}$$

Here, kq denotes a linear thermal expansion coefficient of the light-shielding wall 113, and is a value determined according to the material of the light-shielding wall 113.

For example, assuming that: the linear thermal expansion coefficient kq is 7e−5 (/° C.); the reference temperature T0 is 20 (° C.); and the x-axial length Qx0 of the light-shielding wail 113 at the temperature T0 is 10 (mm), the amount of change in the x-axial length of the light-shielding wall 113 is Qx−Qx0=7 (μm) when the temperature T=30° C. Here, given that the pixel pitch of the imaging element 122 is 2 μm, the change in the length is equivalent to 3.5 pixels. Thus, when the resolution for determining the length from an image is 0.1 pixels, the temperature estimation unit 143 can calculate the estimate temperature Te with a resolution of 0.29° C. (=10° C./(3.5 pix/0.1 pix)).

As described above, the imaging device of the present embodiment is capable of estimating the temperature by using the temperature-variation-caused change in the shape of the light-shielding wall, which is generally included in imaging devices having a lens array. In other words, the imaging device according to an aspect of the present invention is capable of estimating the temperature without a thermal sensor for the temperature detection.

The temperature estimated in such a manner can be used for temperature compensation when the distance to the object is measured using a disparity between plural images. Further, the estimate temperature can be also used simply as the temperature to be displayed on a thermometer and so on.

It is to be noted that the temperature estimation unit 143 in the present embodiment estimates a temperature using Equation (9). However, it may estimate a temperature corresponding to the detected lengths of the image of the light-shielding wall, by referring to a temperature estimation table in which a correspondence between temperature and the lengths of the image of the light-shielding wall is stored in association with plural temperatures. In such a case, the storing unit 146 stores the temperature estimation table.

In addition, the temperature estimation unit 143 in the present embodiment may calculate a temperature using an equation different from Equation (9). For example, the temperature estimation unit 143 may calculate a temperature using a quadratic or greater polynominal expression having the lengths of the light-shielding wall as variables. In such a case, the storing unit 146 stores polynominal coefficients. The polynominal coefficients are not limited to a linear thermal expansion coefficient, a reference temperature, and the lengths of the light-shielding wall at a reference temperature.

In addition, the temperature estimation unit 143 in the present embodiment estimates a temperature using the data stored in the storing unit 146; however, it may estimate a temperature after obtaining data held in a device other than the imaging device 100.

(Embodiment 2)

The imaging device according to Embodiment 2 of the present invention is characterized in evaluating the reliability of a temperature obtained by a thermal sensor, by comparing the temperature obtained by the thermal sensor with a temperature estimated in the same manner as in Embodiment 1.

Hereinafter, the imaging device according to Embodiment 2 of the present invention is described with reference to the drawings. It is to be noted that the constituent elements common to Embodiment 1 are given the same numerical references, and descriptions thereof are omitted.

Figure 9:
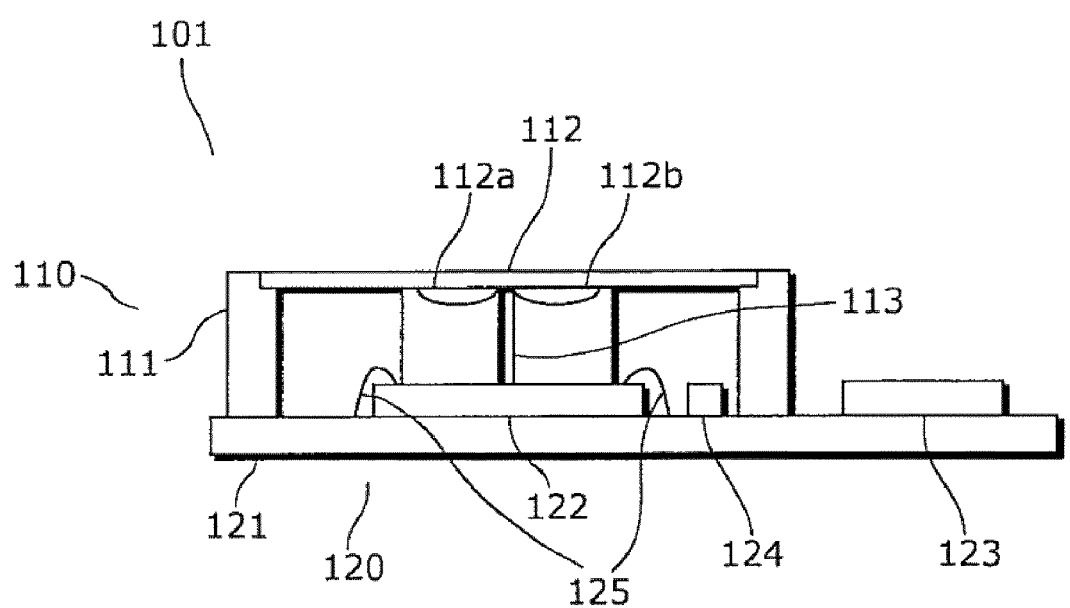
FIG. 9 is a sectional view showing the structure of an imaging device according to Embodiment 2 of the present invention.
Figure 10:
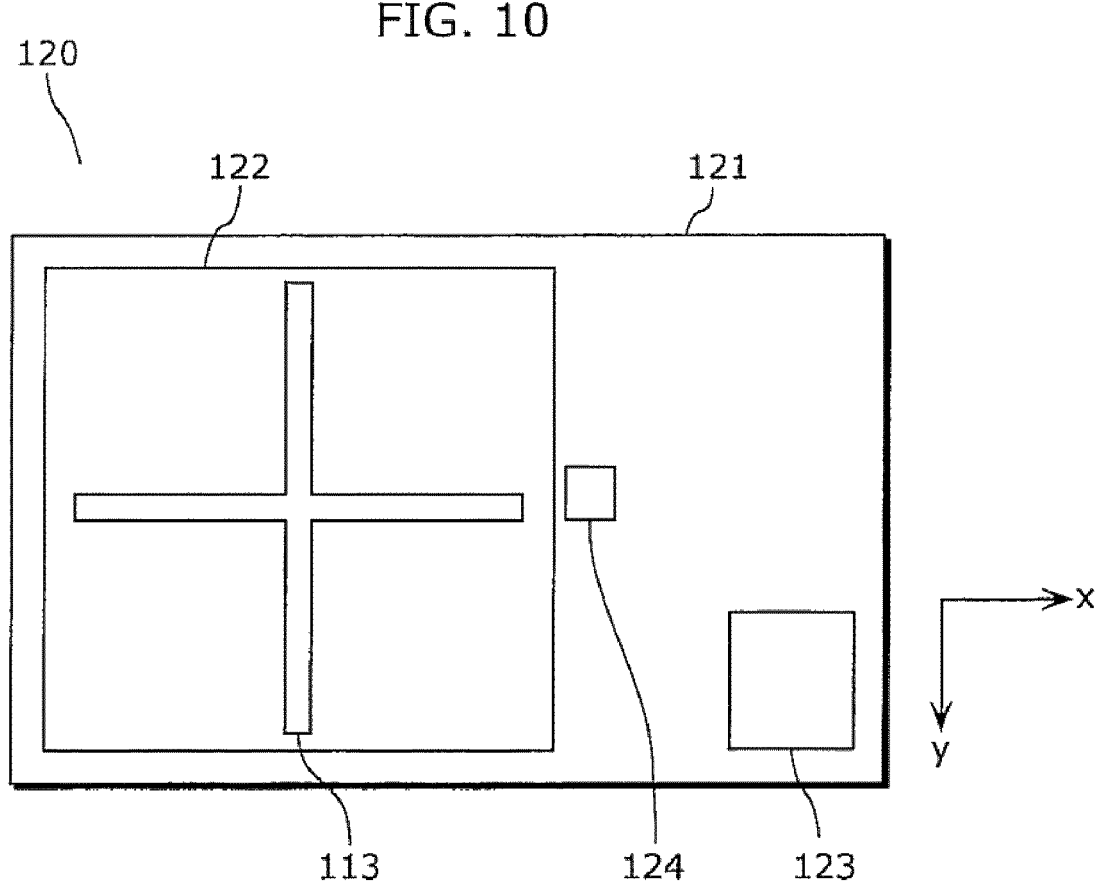
FIG. 10 is a plan view of an imaging device according to Embodiment 2 of the present invention, in a state where a lens tube and a lens array are removed.

FIG. 9 is a sectional view showing the structure of an imaging device 101 according to Embodiment 2 of the present invention. FIG. 10 is a plan view showing a state where the lens tube 111 and the lens array 112 of the imaging device 101 according to Embodiment 2 of the present invention' are removed.

As shown in FIGS. 9 and 10, the imaging device 101 of Embodiment 2 is different from the imaging device 100 of Embodiment 1 in that it includes a thermal sensor 124. The other constituent elements, however, are the same as those of the imaging device 100 of Embodiment 1. Hereinafter, the thermal sensor 124 is described.

The thermal sensor 124 includes a thermistor, for example, and is a circuit which detects a temperature. To be more specific, the thermal sensor 124 has a structure shown in FIG. 11.

Figure 11:
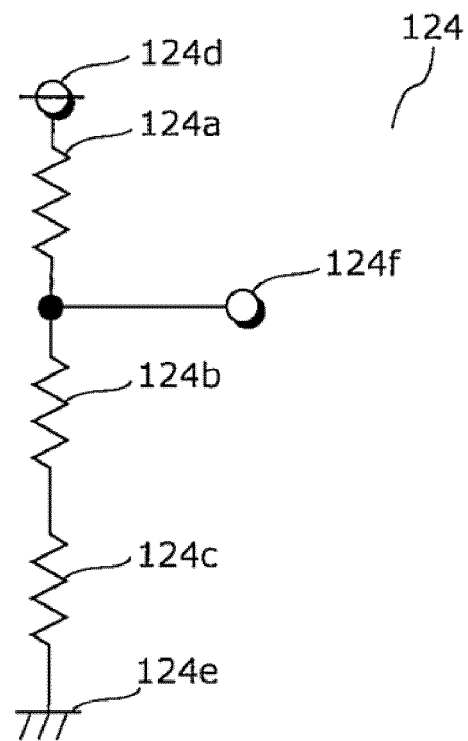
FIG. 11 is a circuit diagram of a thermal sensor included in an imaging device according to Embodiment 2 of the present invention.

FIG. 11 is a circuit diagram of the thermal sensor 124 included in the imaging device 101 according to Embodiment 2 of the present invention.

As shown in FIG. 11, the thermal sensor 124 is a circuit having a first fixed resistor 124a, a thermistor 124b, and a second fixed resistor 124c connected in series. The end of the first fixed resistor 124a which is not connected to the thermistor 124b is connected to a power source 124d (3.3 V, for example, and different from the power source of the SLSI). Further, the end of the second fixed resistor 124c which is not connected to the thermistor 124b is connected to a ground 124e (0 V, for example, and the same potential as the ground of the SLSI 123). Furthermore, a node 124f between the first fixed resistor 124a and the thermistor 124b is connected to the SLSI 123.

Figure 12:
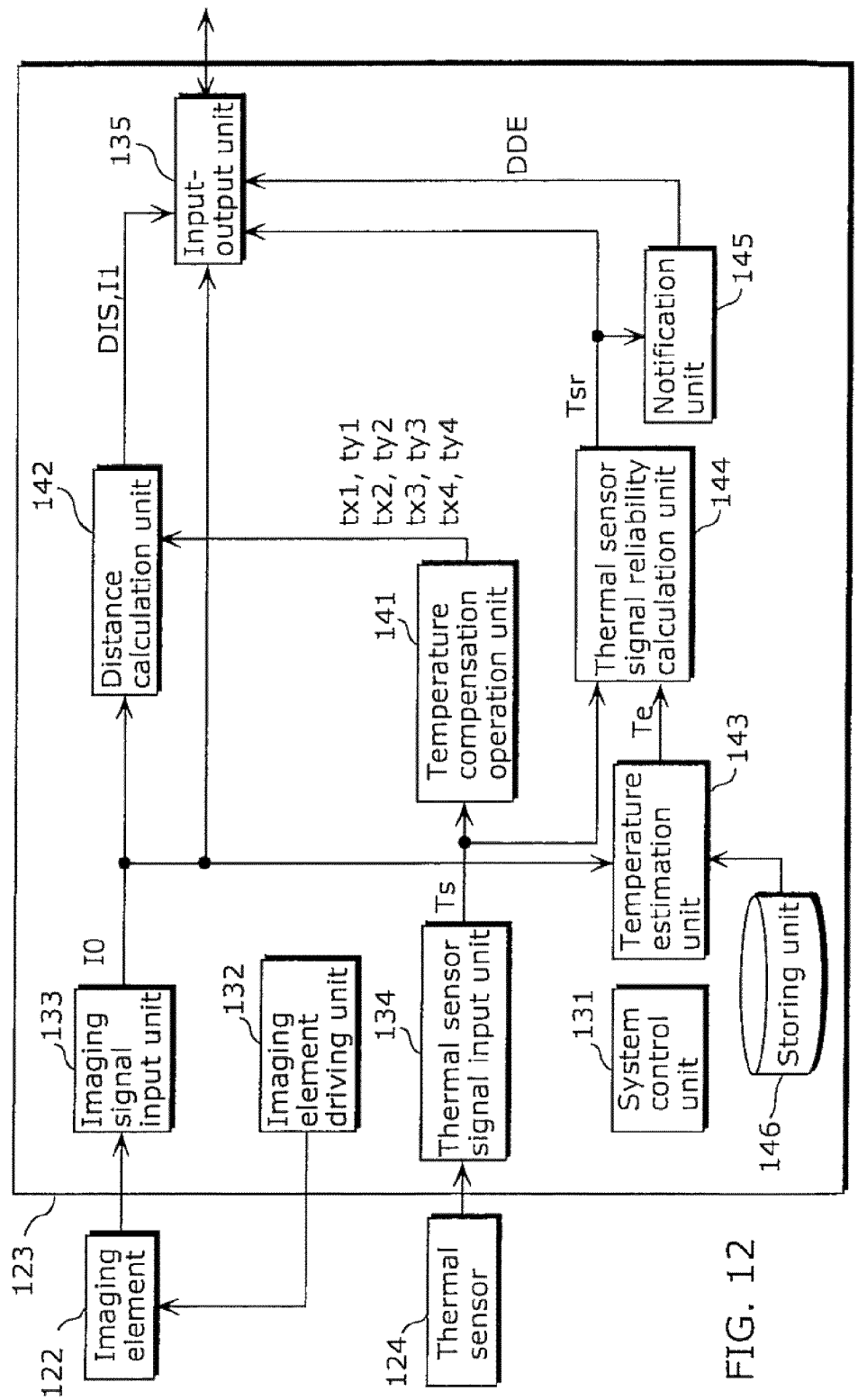
FIG. 12 is a block diagram showing the characteristic functional structure of an imaging device according to Embodiment 2 of the present invention.

FIG. 12 is a block diagram showing the characteristic functional structure of the imaging device 101 according to Embodiment 2 of the present invention.

As shown in FIG. 12, the imaging device 101 includes a system control unit 131, an imaging element driving unit 132, an imaging signal input unit 133, a thermal sensor signal input unit 134, an input-output unit 135, a temperature compensation operation unit 141, a distance calculation unit 142, a temperature estimation unit 143, a thermal sensor signal reliability calculation unit 144, a notification unit 145, and a storing unit 146.

The system control unit 131 includes a central processing unit (CPU) and a logic circuit, for example, and controls the SLSI 123 as a whole.

The imaging element driving unit 132 includes a logic circuit, for example, and upon receiving an instruction from the system control unit 131, generates a signal for driving the imaging element 122 and applies a voltage corresponding to the generated signal to the imaging element 122.

The imaging signal input unit 133 is a circuit including a correlated double sampling (CDS) circuit, an automatic gain controller (AGC), and an analog digital converter (ADC) that are connected in series. An electric signal received from the imaging element 122 undergoes the CDS circuit for removing fixed noise, the AGC for gain adjustment, and the ADC for analog-digital conversion, so that the electric signal becomes an imaging signal I0.

The thermal sensor signal input unit 134 includes an ADC, for example, and outputs a thermal sensor signal Ts generated by digitalizing a thermal sensor signal, which is an analog voltage signal.

The input-output unit 135 outputs image data, distance data, and notification data to the outside of the imaging device 101.

The temperature compensation operation unit 141 performs distortion correction on an imaging signal using the thermal sensor signal Ts. To be more specific, the temperature compensation operation unit 141 calculates a distance by which the optical axis of each lens shifts due to a temperature rise, and corrects coordinate conversion tables based on the calculated shift distance.

The distance calculation unit 142 calculates distance data and a first imaging signal, using an imaging signal and coordinate conversion tables. Here, the first imaging signal is a signal corresponding to an image formed on the first imaging area by the first lens. The principle of the distance data calculation is described later with reference to FIGS. 13 and 14.

As with the imaging device 100 of Embodiment 1, the temperature estimation unit 143 estimates the temperature of the light-shielding wall 113 by calculating, using the imaging signal I0 provided by the imaging signal input unit 133, the lengths of the image of the light-shielding wall 113 projected on the imaging plane of the imaging element 122.

The thermal sensor signal reliability calculation unit 144 calculates the reliability value of the thermal sensor signal such that the reliability is lower when the difference between the thermal sensor signal and the estimate temperature is larger. Here, the thermal sensor signal reliability value is defined that the value is greater when the reliability is lower.

The notification unit 145 sets the value of notification data to 1 when the thermal sensor signal reliability value is equal to or greater than a set value, and sets the value of the notification data to 0 when the thermal sensor signal reliability value is smaller than the set value. In other words, the notification unit 145 generates notification data whose value is 1 when the reliability is low.

The storing unit 146 includes a flash memory, for example, and stores a predetermined temperature and the lengths of the image of the light-shielding wall 113 at the predetermined temperature. More specifically, the storing unit 146 stores a temperature T0, as well as a linear thermal expansion coefficient kq of the light-shielding wall 113 and an x-axial length Qx0 and a y-axial length Qy0 of the image of the light-shielding wall 113 at the temperature T0.

It is to be noted that the notification unit 145 in the present embodiment only generates notification data; however, it may include a means for providing a notification to the user, a management company and so on based on the notification data generated. In addition, the notification unit 145 may include a light-emitting diode (LED) and cause the LED to emit light when the value of the notification data is 1.

Next, the principle of the distance data calculation performed by the distance calculation unit 142 is described with reference to FIGS. 13 and 14. For convenience of the description, FIGS. 13 and 14 only show the first lens 112a and the second lens 112b, and omit the third lens 112c and the fourth lens 112d.

Figure 13:
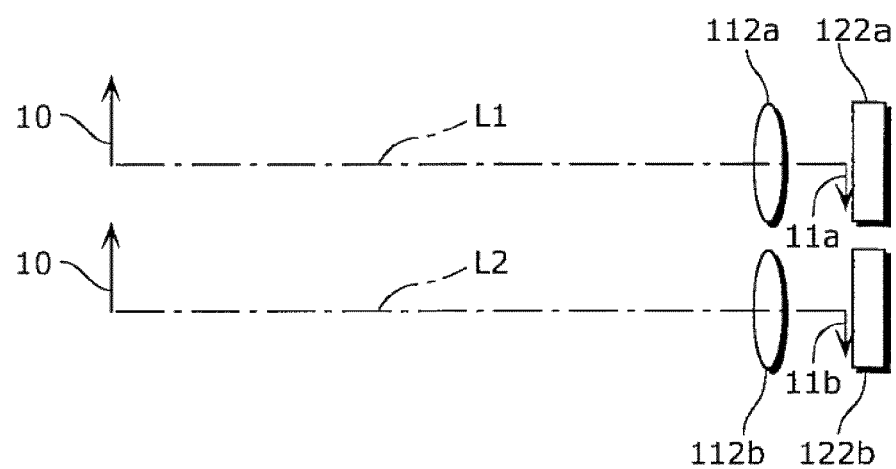
FIG. 13 is an explanatory diagram of positions at which images of an object at infinity are formed, in an imaging device according to Embodiment 2 of the present invention.

FIG. 13 is an explanatory diagram of positions at which images of an object at infinity are formed, in the imaging device 101 according to Embodiment 2 of the present invention.

Incident light L1 which is representative light entering the first lens 112a from an object 10 at infinity is parallel to incident light L2 which is representative light entering the second lens 112b. (Here, for convenience of the description, two objects 10 are shown. In reality, however, the object 10 is a single object. In other words, two objects 10 at infinity are shown in order to explicitly illustrate that the incident light L1 and the incident light L2 from the object 10 at infinity are parallel.) Thus, the distance between the optical axis of the first lens 112a and the optical axis of the second lens 112b is equal to the distance between the position on the imaging element 122 at which an object image 11a is formed and the position on the imaging element 122 at which an object image 11b is formed. In other words, a disparity, which is a difference between the distance between the optical axes and the distance between the image forming positions, does not occur.

Figure 14:
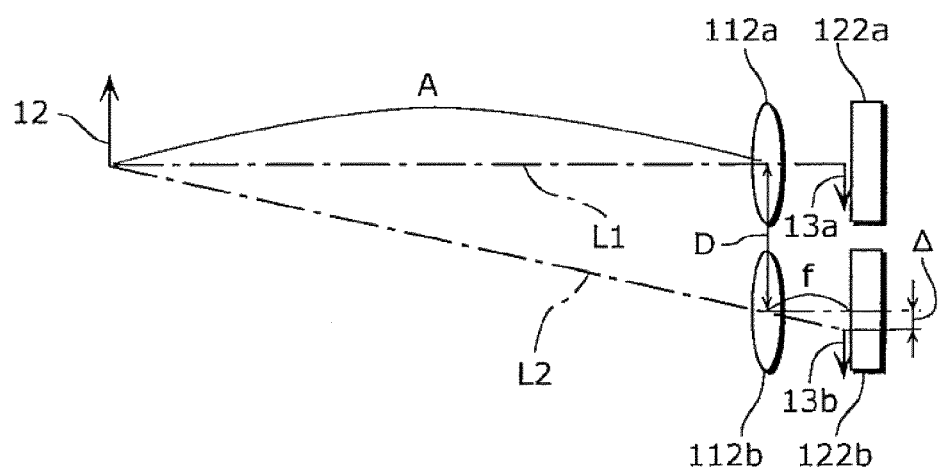
FIG. 14 is an explanatory diagram of positions at which images of an object at a finite distance are formed, in an imaging device according to Embodiment 2 of the present invention.

FIG. 14 is an explanatory diagram of positions at which images of an object at a finite distance are formed, in the imaging device 101 according to Embodiment 2 of the present invention.

Incident light L1 which is representative light entering the first lens 112a from an object 12 at a finite distance is not parallel to incident light L2 which is representative light entering the second lens 112b. Thus, the distance between the position on the imaging element 122 at which an object image 13a is formed and the position on the imaging element 122 at which an object image 13b is formed is longer than the distance between the optical axis of the first lens 112a and the optical axis of the second lens 112b. In other words, a disparity occurs.

Here, it is assumed that: the distance between the principle point of the first lens 112a and the object 12 (object distance) is A; the distance between the optical axis of the first lens 112a and the optical axis of the second lens 112b is D; and the focal length of the first lens 112a and the second lens 112b is 1. With such assumptions, as shown in FIG. 14, the right-angled triangle having A and D as the two sides forming a right angle is similar to the right-angled triangle having f and Δ as the two sides forming a right angle, and thus a disparity value Δ is expressed as Equation (10).

[Math. 5]

$$\Delta = f\frac{D}{A} \qquad (10)$$

The same relationship applies to the other lenses. In the described manner, four object images, each of which is formed by a corresponding one of the four lenses 112a, 112b, 112c, and 112d, change in relative position, according to the object distance. For example, the disparity value Δ increases when the object distance A decreases. In view of the above, as shown in Equation (11), solving Equation (10) for the object distance A allows calculation of the object distance A from the disparity value Δ.

[Math. 6]

$$A = f\frac{D}{\Delta} \qquad (11)$$

Described next with reference to FIG. 3 is the distance by which the optical axis of each lens shifts due to a temperature rise.

The lens array 112 expands with a rise in the temperature of the lens array 112. More specifically, as indicated by arrows in FIG. 3, a temperature rise causes the optical axis of each lens to shift outward of the lens. Here, assuming that the lens array expands isotropically to in proportion to the temperature rise, the amount of change in the spacing between the optical axes is calculated using Equations (12) and (13).

[Math. 7]

$$ddx = \frac{Dx(aL - aS)(T - T0)}{p} \qquad (12)$$

$$ddy = \frac{Dy(aL - aS)(T - T0)}{p} \qquad (13)$$

Here, ddx denotes an amount of change in the x-axial spacing between the optical axes caused by a temperature rise, and the unit of ddx is the spacing of light-receiving elements of the imaging element 122. Further, ddy denotes an amount of y-axial change in the spacing between the optical axes caused by a temperature rise, and the unit of ddy is the spacing of the light-receiving elements of the imaging element 122. Dx denotes an x-axial spacing between the optical axes of the lenses at the reference temperature T0, and Dy denotes a y-axial spacing between the optical axes of the lenses at the reference temperature T0. Further, aL denotes a linear thermal expansion coefficient of the lens array 112, and aS denotes a linear thermal expansion coefficient of the imaging element 122. T denotes a temperature and T0 denotes a reference temperature. Further, p denotes a spacing of the light-receiving elements of the imaging element 122.

Assuming that each lens expands isotropically, as shown in FIG. 3, the optical axis of each lens shifts by a half of a change in the spacing between the optical axes of the lenses caused by a temperature rise (p*ddx/2 in the x-axial direction and p*ddy/2 in the y-axial direction). That is to say, the optical axis of the first lens 112a shifts by −p*ddx/2 in the x-axial direction and −p*ddy/2 in the y-axial direction. The optical axis of the second lens 112b shifts by +p*ddx/2 in the x-axial direction and −p*ddy/2 in the y-axial direction. The optical axis of the third lens 112c shifts by −p*ddx/2 in the x-axial direction and +p*ddy/2 in the y-axial direction. The optical axis of the fourth lens 112d shifts by +p*ddx/2 in the x-axial direction and +p*ddy/2 in the y-axial direction.

Accordingly, using the amounts of change ddx and ddy calculated based on the detected temperature T, the imaging device can estimate the distances by which the optical axes of the lenses in the lens array 112 shift. Then, the imaging device can perform various compensation using the estimated shift distances of the optical axes. As a result, the imaging device can reduce the adverse effect of the expansion of the lens array 112 caused by temperature variation, and calculate an accurate disparity. To put it differently, the imaging device can calculate an accurate distance using an accurate disparity.

Next is a description of the operation of the imaging device 101 having the above structure.

Figure 15:
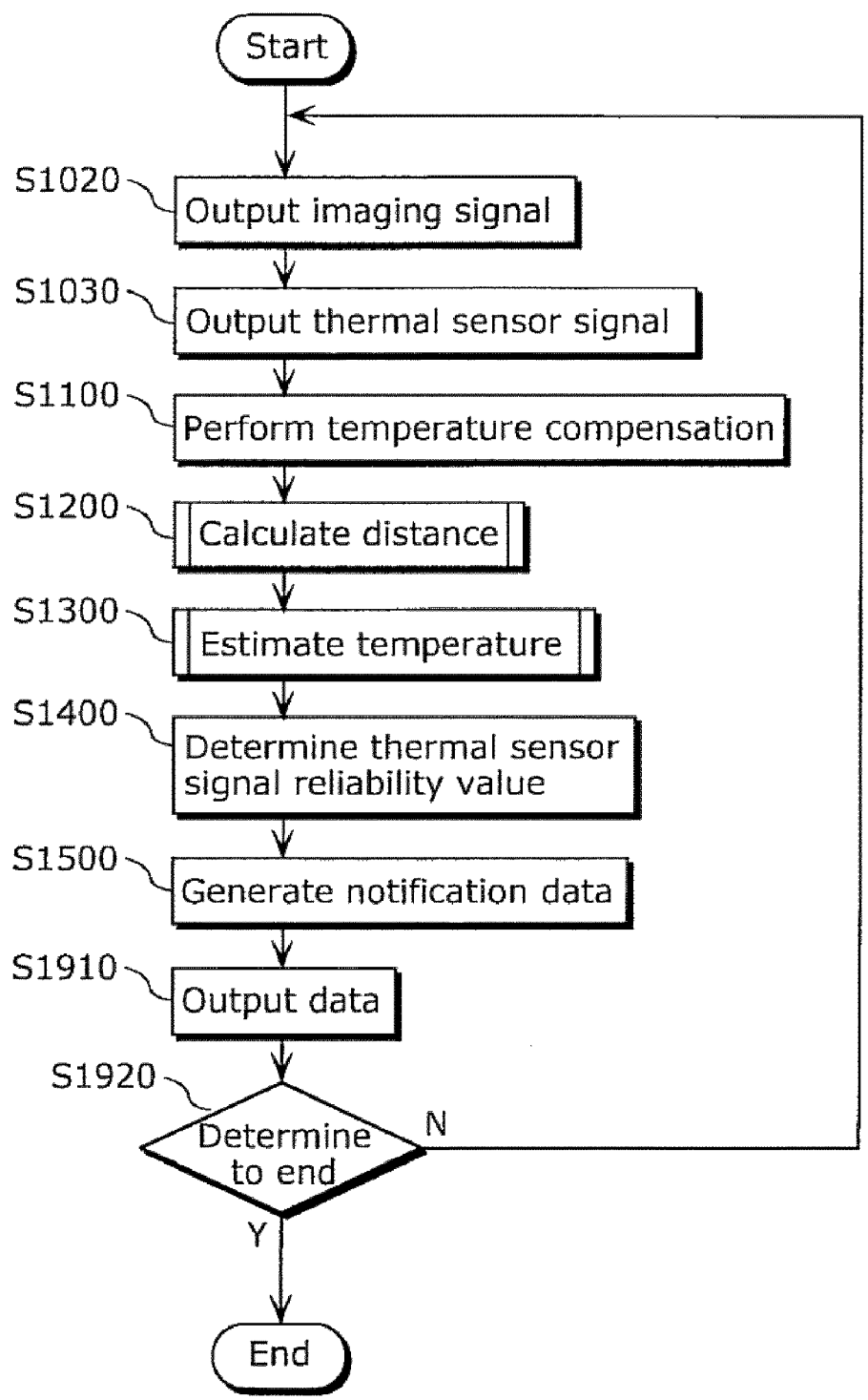
FIG. 15 is a flowchart showing the operation of an imaging device according to Embodiment 2 of the present invention.

FIG. 15 is a flowchart showing the operation of the imaging device 101 according to Embodiment 2 of the present invention.

For example, the imaging device 101 starts the following operation upon receiving, via the input-output unit 135, an instruction from an upper CPU (not shown) to start the operation.

Initially, the imaging signal input unit 133 generates, using the CDS circuit, AGC, and ADC, an imaging signal I0 from an electric signal obtained from the imaging element 122 (Step S1020). Here, the imaging signal input unit 133 outputs the imaging signal I0 (x, y) having H0 pixel(s) in the x-axial direction and V0 pixel(s) in the y-axial direction, in the order starting from I0 (0, 0), I0 (1, 0), I0 (2, 0), . . . , I0 (H0−1, V0−1).

Next, the thermal sensor signal input unit 134 digitalizes a thermal sensor signal which is an analog voltage signal, and outputs the digitalized signal as a thermal sensor signal Ts (Step S1030).

Next, the temperature compensation operation unit 141 performs distortion correction on the imaging signal using the thermal sensor signal Ts (Step S1100). More specifically, as shown in FIG. 3, coordinate conversion tables are corrected based on the distances (p*ddx/2, p*ddy/2) by which the optical axes of the respective lenses shift due to a temperature rise.

Figure 16:
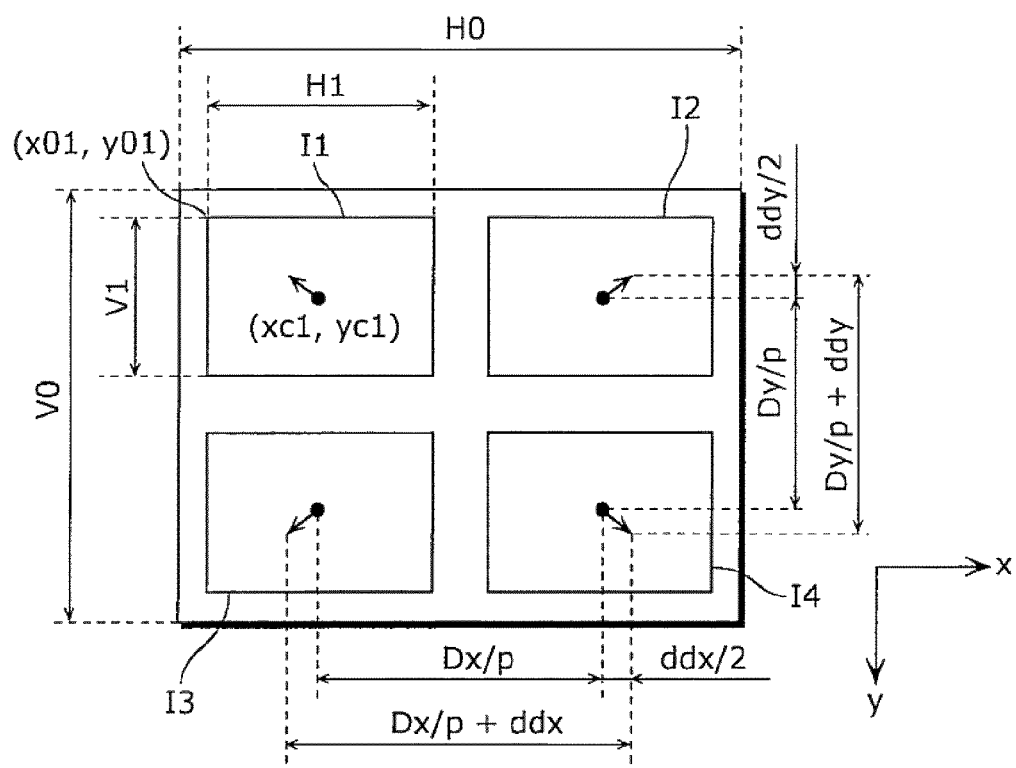
FIG. 16 is an explanatory diagram of a position at which an imaging signal of an imaging device according to Embodiment 2 of the present invention is extracted.

Described hereinafter with reference to FIG. 16 is a specific example of processing performed by the temperature compensation operation unit 141 in Step S1100.

FIG. 16 is an explanatory diagram of a position at which the imaging signal of the imaging device 101 according to Embodiment 2 of the present invention is extracted.

The temperature compensation operation unit 141 creates conversion tables tx1 (x, y) and ty1 (x, y) for a first imaging signal I1 (x, y), using Equations (14), (15), and (16). Here, as shown in FIG. 16, (x01, y01) are the origin coordinates in the case of no distortion in the imaging signal M. Further, (xc1, yc1) are the optical axis coordinates of the imaging signal I1 (x, y) at the reference temperature T0. Furthermore, (−ddx/2, −ddy/2) denotes an amount of shift of the corresponding optical axis caused by a temperature rise, and kd2 and kd4 denote distortion coefficients.

The temperature compensation operation unit 141 also creates conversion tables tx2 (x, y) and ty2 (x, y) for a second imaging signal I2 (x, y), using Equations (17), (18), and (19). Here, as shown in FIG. 16, (x02, y02) are the origin coordinates in the case of no distortion in the imaging signal I0. Further, (xc2, yc2) are the optical axis coordinates of the imaging signal I2 (x, y) at the reference temperature T0. Furthermore, (+ddx/2, −ddy/2) denotes an amount of shift of the corresponding optical axis caused by a temperature rise, and kd2 and kd4 denote distortion coefficients.

The temperature compensation operation unit 141 also creates conversion tables tx3 (x, y) and ty3 (x, y) for a third imaging signal I3 (x, y), using Equations (20), (21), and (22). Here, as shown in FIG. 16, (x03, y03) are the origin coordinates in the case of no distortion in the imaging signal M. Further, (xc3, yc3) are the corresponding optical axis coordinates of the imaging signal I3 (x, y) at the reference temperature T0. Furthermore, (−ddx/2, +ddy/2) denotes an amount of shift of the optical axis caused by a temperature rise, and kd2 and kd4 denote distortion coefficients.

The temperature compensation operation unit 141 also creates conversion tables tx4 (x, y) and ty4 (x, y) for a fourth imaging signal I4 (x, y), using Equations (23), (24), and (25). Here, as shown in FIG. 16, (x04, y04) are the origin coordinates in the case of no distortion in the imaging signal I0. Further, (xc4, yc4) are the optical axis coordinates of the imaging signal I4 (x, y) at the reference temperature T0. Furthermore, (+ddx/2, +ddy/2) denotes an amount of shift of the corresponding optical axis caused by a temperature rise, and kd2 and kd4 denote distortion coefficients.

[Math. 8]

$$tx1(x, y) = \\ x01 + xc1 + \left(x - xc1 - \frac{ddx}{2}\right) \times (1 + kd2 \times r^{\wedge}2 + kd4 \times r^{\wedge}4) \quad (14)$$

$$ty1(x, y) = \\ y01 + yc1 + \left(y - yc1 - \frac{ddy}{2}\right) \times (1 + kd2 \times r^{\wedge}2 + kd4 \times r^{\wedge}4) \quad (15)$$

$$r^{\wedge}2 = \left(x - xc1 - \frac{ddx}{2}\right)^{\wedge}2 + \left(y - yc1 - \frac{ddy}{2}\right)^{\wedge}2 \quad (16)$$

$$tx2(x, \overline{y}) = \\ x02 + xc2 + \left(x - xc2 + \frac{ddx}{2}\right) \times (1 + kd2 \times r^{\wedge}2 + kd4 \times r^{\wedge}4) \quad (17)$$

$$ty2(x, y) = \\ y02 + yc2 + \left(y - yc2 - \frac{ddy}{2}\right) \times (1 + kd2 \times r^{\wedge}2 + kd4 \times r^{\wedge}4) \quad (18)$$

$$r^{\wedge}2 = \left(x - xc2 + \frac{ddx}{2}\right)^{\wedge}2 + \left(y - yc2 - \frac{ddy}{2}\right)^{\wedge}2 \quad (19)$$

-continued $$tx3(x, y) = \qquad (20)$$
$$x03 + xc3 + \left(x - xc3 - \frac{ddx}{2}\right) \times (1 + kd2 \times r^\wedge 2 + kd4 \times r^\wedge 4)$$

$$ty3(x, y) = \qquad (21)$$
$$y03 + yc3 + \left(y - yc3 + \frac{ddy}{2}\right) \times (1 + kd2 \times r^\wedge 2 + kd4 \times r^\wedge 4)$$

$$r^\wedge 2 = \left(x - xc3 - \frac{ddx}{2}\right)^\wedge 2 + \left(y - yc3 + \frac{ddy}{2}\right)^\wedge 2 \qquad (22)$$

$$tx4(x, y) = \qquad (23)$$
$$x04 + xc4 + \left(x - xc4 + \frac{ddx}{2}\right) \times (1 + kd2 \times r^\wedge 2 + kd4 \times r^\wedge 4)$$

$$ty4(x, y) = \qquad (24)$$
$$y04 + yc4 + \left(y - yc4 + \frac{ddy}{2}\right) \times (1 + kd2 \times r^\wedge 2 + kd4 \times r^\wedge 4)$$

$$r^\wedge 2 = \left(x - xc4 + \frac{ddx}{2}\right)^\wedge 2 + \left(y - yc4 + \frac{ddy}{2}\right)^\wedge 2 \qquad (25)$$

It is to be noted that in the case of no distortion, the creation of the above coordinate conversion tables is equivalent to extraction of an image from the imaging signal I0 (x, y) as shown in Equations (26), (27), (28), and (29), followed by parallel shifting of the extracted image as shown in Equations (30), (31), (32), and (33).

[Math. 9]

$$I1(x, y) = I0(x + x01, y + y01) \qquad (26)$$

$$I2(x, y) = I0(x + x02, y + y02) \qquad (27)$$

$$I3(x, y) = I0(x + x03, y + y03) \qquad (28)$$

$$I4(x, y) = I0(x + x04, y + y04) \qquad (29)$$

$$I1(x, y) = I1\left(x - \frac{ddx}{2}, y - \frac{ddy}{2}\right) \qquad (30)$$

$$I2(x, y) = I2\left(x + \frac{ddx}{2}, y - \frac{ddy}{2}\right) \qquad (31)$$

$$I3(x, y) = I3\left(x - \frac{ddx}{2}, y + \frac{ddy}{2}\right) \qquad (32)$$

$$I4(x, y) = I4\left(x + \frac{ddx}{2}, y + \frac{ddy}{2}\right) \qquad (33)$$

The description of the flowchart shown in FIG. 15 continues hereinafter.

Next, the distance calculation unit 142 generates distance data DIS and the first imaging signal I1, using the imaging signal I0 and the coordinate conversion tables tx1 (x, y), ty1 (x, y), tx2 (x, y), ty2 (x, y), tx3 (x, y), ty3 (x, y), tx4 (x, y), and ty4 (x, y) (Step S1200). This processing is described later in detail with reference to FIG. 17.

Next, the temperature estimation unit 143 estimates an estimate temperature Te, using the imaging signal I0 (Step S1300). This processing is described later in detail with reference to FIG. 21.

Next, the thermal sensor signal reliability calculation unit 144 calculates thermal sensor signal reliability value Tsr such that the reliability of the thermal sensor signal Ts is lower when the difference between the thermal sensor signal Ts and the estimate temperature Te is larger (Step S1400). Specifically, the thermal sensor signal reliability calculation unit 144 calculates the thermal sensor signal reliability value Tsr using Equation (34).

[Math. 10]

$$Tsr = \left| \frac{(Ts + Ts0) - (Te + Te0)}{Ts + Ts0} \right| \qquad (34)$$

Here, Te0 and Ts0 are offset values. Further, as shown in Equation (34), the thermal sensor signal reliability value Tsr is defined that it indicates higher reliability when its value is smaller, and indicates lower reliability when its value is greater.

Next, the notification unit 145 sets the value of notification data DDE to 1 when the thermal sensor signal reliability value Tsr is equal to or greater than a set value Tsr0, and sets the value of the notification data DDE to 0 when the thermal sensor signal reliability value Tsr is smaller than the set value Tsr0. Specifically, the notification unit 145 generates the notification data DDE using Equation (35) (Step S1500). That is to say, the value of the notification data DDE being 1 shows that the reliability of the thermal sensor signal Ts is low. On the other hand, the value of the notification data DDE being 0 shows that the reliability of the thermal sensor signal Ts is high.

[Math. 11]

$$DDE = \begin{cases} 0 & (\text{when } Tsr < Tsr0) \\ 1 & (\text{when } Tsr \geq Tsr0) \end{cases} \qquad (35)$$

Next, the input-output unit 135 outputs image data, distance data, reliability data, notification data and so on to the outside of the imaging device 101 (Step S1910). Here, the image data is the imaging signal I0 or the first imaging signal I1. The distance data is the distance data DIS calculated by the distance calculation unit 142. The reliability data is the thermal sensor signal reliability value Tsr calculated by the thermal sensor signal reliability calculation unit 144. The notification data is the notification data DDE generated by the notification unit 145.

Next, the system control unit 131 determines whether or not to end the processing (Step S1920). For example, the system control unit 131 communicates with the upper CPU (not shown) via the input-output unit 135 to request an instruction regarding whether or not to end the operation. In the case of receiving an end instruction from the upper CPU, the system control unit 131 determines to end the processing.

Here, when determining not to end the processing (N in Step S1920), the system control unit 131 repeats the processing from Step S1020. On the other hand, when determining to end the processing (Y in Step S1920), the system control unit 131 ends the processing.

Next, a detailed flow of processing in Step S1200 shown in FIG. 15 is described with reference to FIG. 17.

Figure 17:
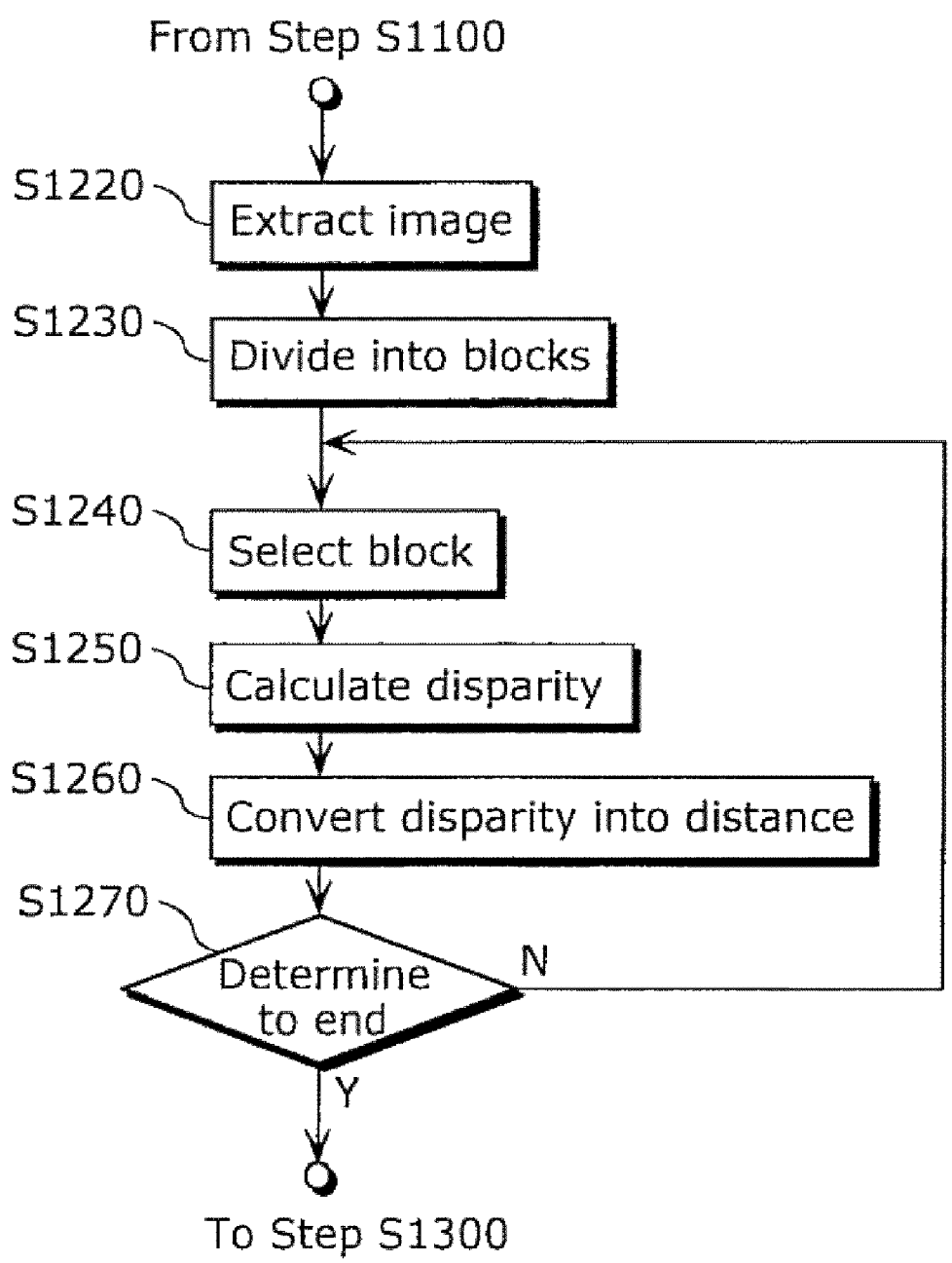
FIG. 17 is a flowchart showing the operation of a distance calculation unit included in an imaging device according to Embodiment 2 of the present invention.

FIG. 17 is a flowchart showing the operation of the distance calculation unit 142 included in the imaging device 101 according to Embodiment 2 of the present invention.

Initially, the distance calculation unit 142 extracts, from the imaging signal I0, an object image formed by each lens (Step S1220). This image extraction is performed simultaneously with the distortion correction. That is to say, the distance calculation unit 142 creates: the first imaging signal I1 (x, y)

corresponding to the first lens 112a; the second imaging signal I2 (x, y) corresponding to the second lens 112b; the third imaging signal I3 (x, y) corresponding to the third lens 112c; and the fourth imaging signal I4 (x, y) corresponding to the fourth lens 112d.

More specifically, the distance calculation unit 142 creates the first imaging signal I1 (x, y) from the imaging signal I0 (x, y) based on the coordinate conversion tables tx1 (x, y) and ty1 (x, y) as shown in Equation (36). In other words, the imaging signal I0 at the coordinates (tx1 (x, y), ty1 (x, y)) is treated as the first imaging signal I1 (x, y).

It is to be noted that the coordinates (tx1 (x, y), ty1 (x, y)) do not have to be a set of integers. In that case, assuming the integer portion of the coordinate conversion table tx1 (x, y) as tx1$i$ (x, y) and the fractional portion as tx1$f$ (x, y), the first imaging signal I1 (x, y) is created using four pixels as shown in Equation (37).

In the same manner, the distance calculation unit 142 creates the second imaging signal I2 (x, y) from the imaging signal I0 (x, y) based on the coordinate conversion tables tx2 (x, y) and ty2 (x, y) as shown in Equation (38).

Further, in the same manner, the distance calculation unit 142 creates the third imaging signal I3 (x, y) from the imaging signal I0 (x, y) based on the coordinate conversion tables tx3 (x, y) and ty3 (x, y) as shown in Equation (39).

Furthermore, in the same manner, the distance calculation unit 142 creates the fourth imaging signal I4 (x, y) from the imaging signal I0 (x, y) based on the coordinate conversion tables tx4 (x, y) and ty4 (x, y) as shown in Equation (40).

[Math. 12]

$$I1(x, y) = I0(tx1(x, y), ty1(x, y)) \quad (36)$$

$$\begin{aligned} I1(x, y) = &\{1 - tx1f(x, y)\} \times \{1 - ty1f(x, y)\} \times I0(tx1i(x, y), ty1i(x, y)) + \\ & tx1f(x, y) \times \{1 - ty1f(x, y)\} \times I0(tx1i(x, y) + 1, ty1i(x, y)) + \\ & \{1 - tx1f(x, y)\} \times ty1f(x, y) \times I0(tx1i(x, y), ty1i(x, y) + 1) + \\ & tx1f(x, y) \times ty1f(x, y) \times I0(tx1i(x, y) + 1, ty1i(x, y) + 1) \end{aligned} \quad (37)$$

$$I2(x, y) = I0(tx2(x, y), ty2(x, y)) \quad (38)$$

$$I3(x, y) = I0(tx3(x, y), ty3(x, y)) \quad (39)$$

$$I4(x, y) = I0(tx4(x, y), ty4(x, y)) \quad (40)$$

It is to be noted that in the case of no distortion nor temperature-caused lens expansion, the first imaging signal I1 (x, y) is an image of an area extracted from the imaging signal I0 along H1 pixel(s) in the x-axial direction and V1 pixel(s) in the y-axial direction from the origin point (x01, y01) as shown in FIG. 16. The second imaging signal I2 (x, y) is an image of an area extracted from the imaging signal I0 along H1 pixel(s) in the x-axial direction and V1 pixel(s) in the y-axial direction from the origin point (x02, y02). The third imaging signal I3 (x, y) is an image of an area extracted from the imaging signal I0 along H1 pixel(s) in the x-axial direction and V1 pixel(s) in the y-axial direction from the origin point (x03, y03). The fourth imaging signal I4 (x, y) is an image of an area extracted from the imaging signal I0 along H1 pixel(s) in the x-axial direction and V1 pixel(s) in the y-axial direction from the origin point (x04, y04).

Figure 18:
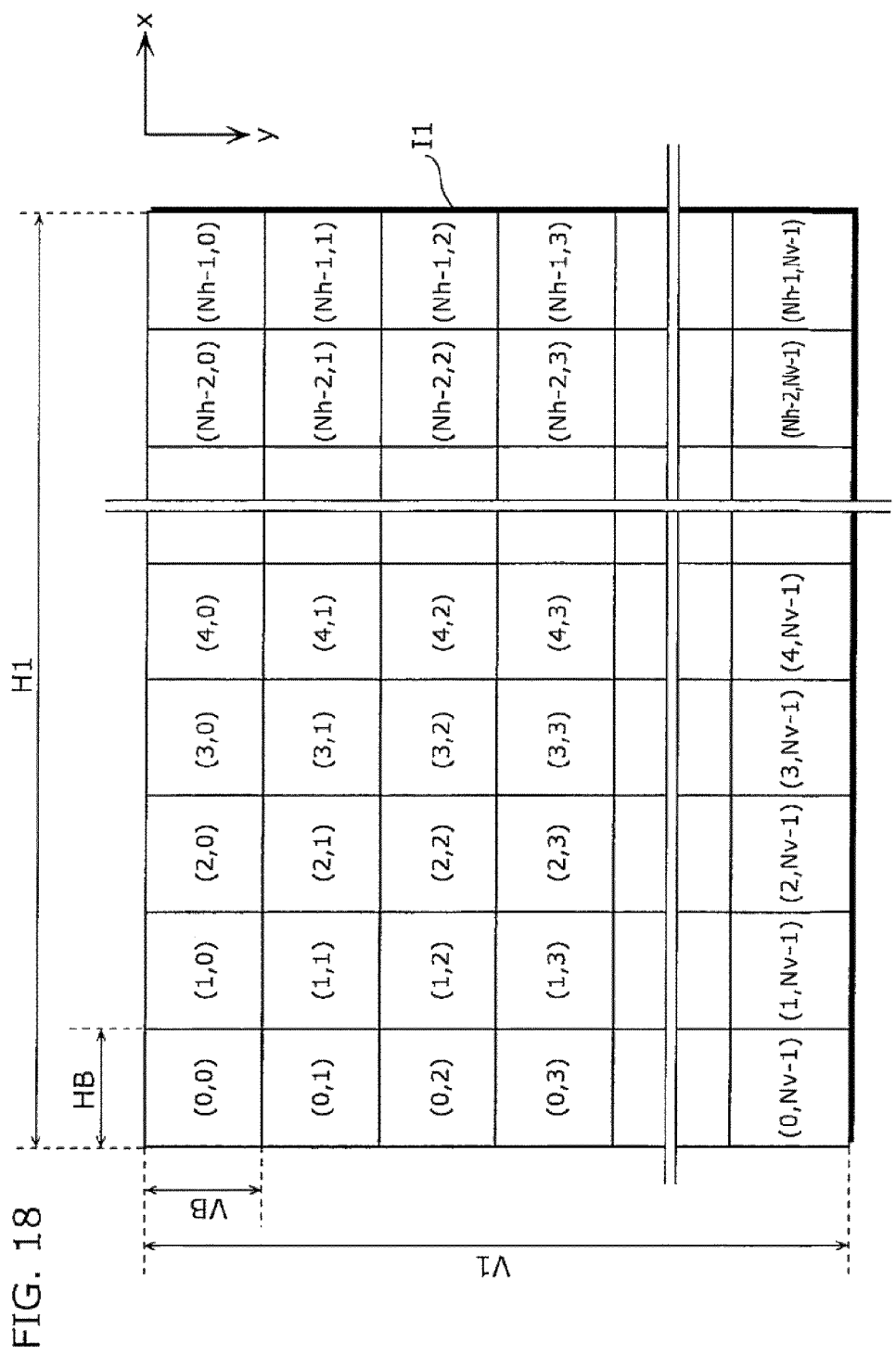
FIG. 18 is an explanatory diagram of block division by an imaging device according to Embodiment 2 of the present invention.

Next, the distance calculation unit 142 divides the imaging signal into blocks (Step S1230). FIG. 18 is an explanatory diagram of block division by the imaging device 101 according to Embodiment 2 of the present invention. In FIG. 18, the first imaging signal I1 is divided into rectangular blocks having HB pixel(s) in the x-axial direction and VB pixel(s) in the y-axial direction, so that the first imaging signal I1 has Nh blocks in the x-axial direction and Nv blocks in the y-axial direction.

Next, the distance calculation unit 142 selects a block (Step S1240). In the case of performing the processing of Step S1240 for the first time after Step S1230, the distance calculation unit 142 selects the block indicated as (0, 0). Then, when performing the processing of Step S1240 next time, the distance calculation unit 142 selects the block on the right.

When selecting a rightmost block shown in FIG. 18 (the blocks indicated as (Nh−1, 0), (Nh−1, 1) and so on), the distance calculation unit 142 selects in the next processing a leftmost block in one row below (the blocks indicated as (0, 1), (0, 2) and so on).

In other words, assuming the $0^{th}$ time as the time of performing the processing of Step S1240 for the first time after Step S1230, the distance calculation unit 142 selects, at the $i^{th}$ time, a block indicated as (i % Nh, int (i/Nh)). Here, i % Nh is the remainder of division of i by Nh, and int (i/Nh) is the integer portion in the quotient of division of by Nh. Hereinafter, the block selected in this manner is referred to as a selected block B (ih, iv).

Next, the distance calculation unit 142 calculates a disparity (Step S1250).

The following is a description of the details of disparity calculation performed by the distance calculation unit 142 in Step S1250.

The distance calculation unit 142 calculates a disparity between the first imaging signal I1 and the second imaging signal I2, and a reliability value of the disparity. Initially, the distance calculation unit 142 calculates a disparity evaluation value R12 (kx) between the first imaging signal I1 and the second imaging signal I2. Here, kx denotes a shift amount, which indicates an amount by which an image is to be shifted, and kx is varied so that kx=0, 1, 2, . . . , SB.

Figure 19:
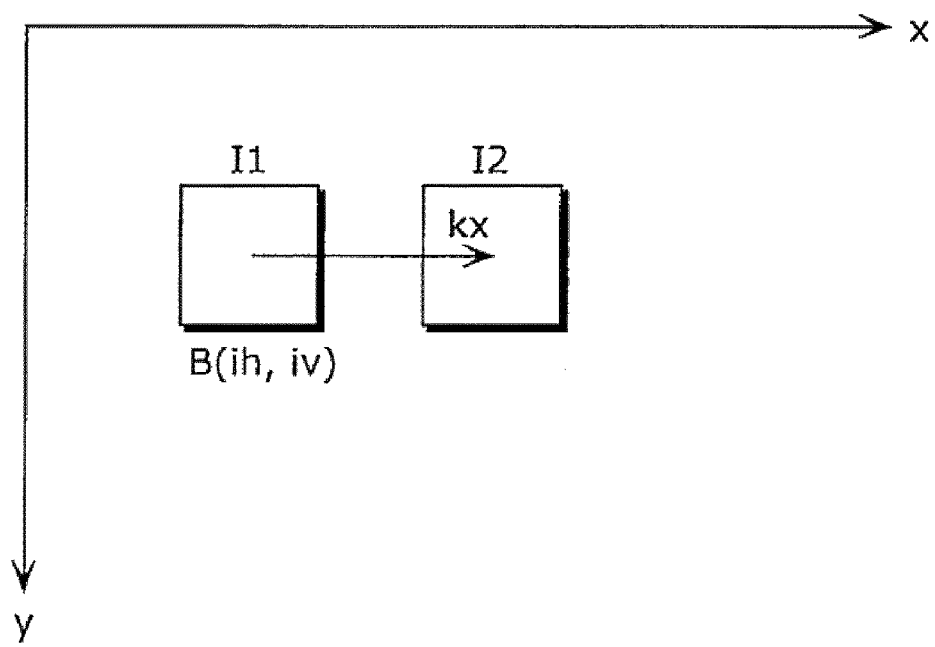
FIG. 19 is an explanatory diagram of blocks for disparity evaluation value calculation according to Embodiment 2 of the present invention.

FIG. 19 is an explanatory diagram of blocks for the disparity evaluation value calculation performed in the disparity calculation of the imaging device 101 according to Embodiment 2 of the present invention using the first imaging signal and the second imaging signal.

In FIG. 19, the block indicated as I1 is the area selected as the selected block B (ih, iv) of the first imaging signal I1. Further, the block indicated as I2 is the second imaging signal I2 in a block x-axially shifted from the coordinates of the selected block by kx. The distance calculation unit 142 calculates, with respect to the shift amount kx=0 to SB, a sum of absolute differences (SAD) shown in Equation (41), so as to obtain the disparity evaluation value R12 (kx). In other words, the distance calculation unit 142 calculates the disparity evaluation value R12 (kx) using the first imaging signal I1 as a reference.

[Math. 13]

$$R12(kx) = \Sigma\Sigma |I1(x,y) - 2(x+kx,y)| \quad (41)$$

The disparity evaluation value R12 (kx) indicates the similarity between the first imaging signal I1 in the selected block B (ih, iv) and the second imaging signal I2 in the block x-axially shifted from the selected block by kx. A smaller disparity evaluation value R12 (kx) indicates higher similarity (stronger resemblance).

Figure 20:
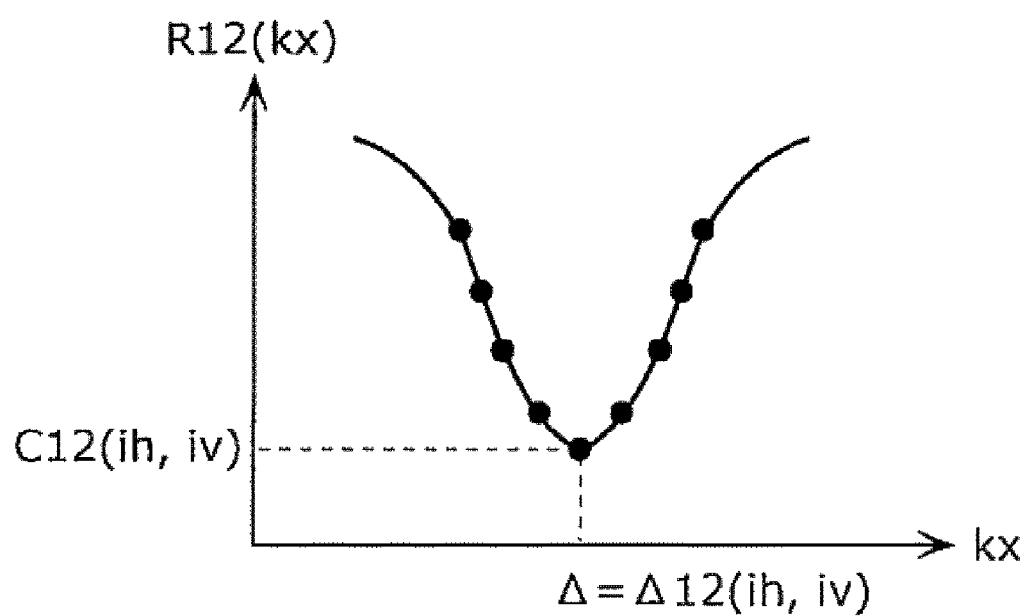
FIG. 20 is an explanatory diagram of a relationship between shift amount and disparity evaluation value according to Embodiment 2 of the present invention.

FIG. 20 is an explanatory diagram of the relationship between the shift amount and the disparity evaluation value involved in the disparity calculation performed by the imaging device 101 according to Embodiment 2 of the present invention using the first imaging signal I1 and the second imaging signal I2.

As shown in FIG. 20, the disparity evaluation value R12 (kx) varies depending on the value of the shift amount kx, and reaches its minimum when the shift amount kx=Δ. More specifically, it shows that the similarity is highest between the first imaging signal I1 in the selected block B (ih, iv) and the second imaging signal I2 in the block x-axially shifted from the selected block by Δ. Thus, it can be understood that the disparity between the first imaging signal I1 and the second imaging signal I2 with respect to the selected block B (ih, iv) is Δ.

In view of the above, the distance calculation unit 142 uses the disparity a to calculate a disparity value Δ12 (ih, iv) between the first imaging signal I1 and the second imaging signal I2 with respect to the selected block B (ih, iv) as shown in Equation (42). Then, the distance calculation unit 142 uses the disparity evaluation value R12 (Δ) to calculate a disparity reliability value C12 (ih, iv) between the first imaging signal I1 and the second imaging signal I2 with respect to the selected block B (ih, iv) as shown in Equation (43).

[Math. 14]

$$\Delta 12(ih, iv) = \Delta \quad (42)$$

$$C12(ih, iv) = R12(\Delta) \quad (43)$$

Next, the distance calculation unit 142 calculates, in the same manner, a disparity between the first imaging signal I1 and the third imaging signal I3, and a reliability value of the disparity. However, the shift is made in the y-axial direction, and the shift amount is ky.

As shown in Equation (44), the distance calculation unit 142 calculates a disparity evaluation value R13 (ky) between the first imaging signal I1 and the third imaging signal I3 with respect to the selected block B (ih, iv). In other words, the distance calculation unit 142 calculates the disparity evaluation value R13 (ky) using the first imaging signal I1 as a reference.

Then, the distance calculation unit 142 uses the shift amount that gives the minimum disparity evaluation value, that is, it uses the disparity Δ, to calculate a disparity value Δ13 (ih, iv) between the first imaging signal I1 and the third imaging signal I3 with respect to the selected block B (ih, iv) as shown in Equation (45). Further, the distance calculation unit 142 uses the disparity evaluation value R13 (Δ) to calculate a disparity reliability value C13 (ih, iv) between the first imaging signal I1 and the third imaging signal I3 with respect to the selected block B (ih, iv) as shown in Equation (46).

[Math. 15]

$$R13(ky) = \Sigma\Sigma |I1(x,y) - I3(x,y+ky)| \quad (44)$$

$$\Delta 13(ih, iv) = \Delta \quad (45)$$

$$C13(ih, iv) = R13(\Delta) \quad (46)$$

Next, the distance calculation unit 142 calculates, in the same manner, a disparity between the first imaging signal I1 and the fourth imaging signal I4, and a reliability value of the disparity. However, the shift is made diagonally (the direction connecting the optical axis of the first lens 112*a* and the optical axis of the fourth lens 112*d*), and the shift amount is kx in the x-axial direction and kx*Dy/Dx in the y-axial direction.

As shown in Equation (47), the distance calculation unit 142 calculates a disparity evaluation value R14 (kx) between the first imaging signal I1 and the fourth imaging signal I4 with respect to the selected block B (ih, iv). In other words, the distance calculation unit 142 calculates the disparity evaluation value R14 (kx) using the first imaging signal I1 as a reference.

Then, the distance calculation unit 142 uses the shift amount that gives the minimum disparity evaluation value, that is, it uses the disparity Δ, to calculate a disparity value Δ14 (ih, iv) between the first imaging signal I1 and the fourth imaging signal I4 with respect to the selected block B (ih, iv) as shown in Equation (48). Further, the distance calculation unit 142 uses the disparity evaluation value R14 (Δ) to calculate a disparity reliability value C14 (ih, iv) between the first imaging signal I1 and the fourth imaging signal I4 with respect to the selected block B (ih, iv) as shown in Equation (49).

In the case where the coordinates (x+kx, y+kx*Dy/Dx) in Equation (47) include a decimal number, the imaging signal I4 is calculated from neighboring pixels using linear interpolation and the like. It is to be noted that as shown in FIG. 3, Dx and Dy are x-axial spacing and y-axial spacings between the first lens 112*a* and the fourth lens 112*d*.

[Math. 16]

$$R14(kx) = \sum\sum \left|I1(x, y) - I4\left(x + kx, y + kx\frac{Dy}{Dx}\right)\right| \quad (47)$$

$$\Delta 14(ih, iv) = \Delta \quad (48)$$

$$C14(ih, iv) R14(\Delta) \quad (49)$$

Then, the distance calculation unit 142 makes a comparison among the above three disparity reliability values, and determines the disparity value having the highest reliability as the disparity value of the block. To be more specific, as shown in Equation (50), the distance calculation unit 142 makes a comparison among the three disparity reliability values C12 (ih, iv), C13 (ih, iv), and C14 (ih, iv), and determines: Δ12 (ih, iv) as the disparity value Δ (ih, iv) of the block B (ih, iv) when C12 (ih, iv) is the smallest; Δ13 (ih, iv) as the disparity value Δ (ih, iv) of the block B (ih, iv) when C13 (ih, iv) is the smallest; and Δ14 (ih, iv) as the disparity value Δ (ih, iv) of the block B (ih, iv) when C14 (ih, iv) is the smallest.

It is to be noted that the sums of absolute differences (Equations (43), (46), and (49)) are used as the reliability values (C12, C13, and C14); however, normalized correlation coefficients may be used instead. In this case, the disparity value which gives the highest reliability is selected. Here, for unification of the disparity values into the x-axial direction, Δ13 (ih, iv) is multiplied by Dx/Dy, which is the ratio of the spacing between the lenses, in the case where Δ13 (ih, iv) is selected.

[Math. 17]

$$\Delta(ih, iv) = \begin{cases} \Delta 12(ih, iv) & \text{(when } C12 \ (ih, iv) \text{ is the smallest)} \\ \Delta 13(ih, iv) \times \frac{Dx}{Dy} & \text{(when } C13 \ (ih, iv) \text{ is the smallest)} \\ \Delta 14(ih, iv) & \text{(when } C14 \ (ih, iv) \text{ is the smallest)} \end{cases} \quad (50)$$

The description of the flowchart shown in FIG. 17 continues hereinafter.

Next, the distance calculation unit 142 calculates a distance from the disparity (Step S1260). Equation (10) can be expressed as Equation (11) when a distance A is to be solved.

Thus, the distance DIS (x, y) of the area included in the block B (ih, iv) can be expressed as Equation (51).

[Math. 18]

$$DIS(x, y) = \frac{f \times Dx}{p \times \Delta(ih, iv)} \quad ((x, y) \text{ is in a range of } B(ih, iv)) \quad (51)$$

Here, f denotes the focal length of the four lenses 112a, 112b, 112c, and 112d, and p denotes a spacing of the light-receiving elements of the imaging element 122. The unit of the disparity value Δ is pixels. Thus, the spacing p of the light-receiving elements is multiplied in Equation (51) so that the disparity value Δ has the same system of units as that of the focal length f and so on.

Next, the distance calculation unit 142 determines whether or not to end the distance calculation (Step S1270). Here, when determining to end the distance calculation (when all the blocks have been selected, that is, when the selected block is B (Nh−1, Nv−1)) (Y in S1270), the processing in Step S1300 in FIG. 15 is performed. On the other hand, when determining not to end the distance calculation (when all the blocks have not been selected yet, that is, when the selected block is not B (Nh−1, Nv−1)) (N in S1270), the processing is performed again from Step S1240.

Next, a detailed flow of processing in Step S1300 shown in FIG. 15 is described with reference to FIG. 21.

Figure 21:
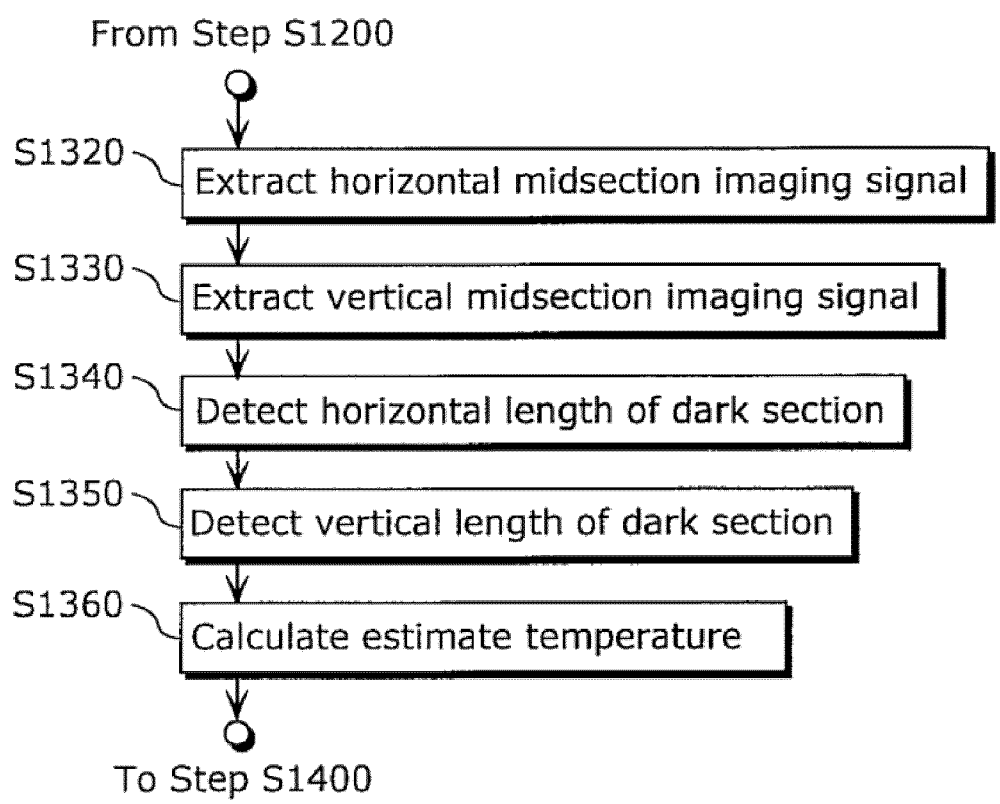
FIG. 21 is a flowchart showing temperature estimation performed by an imaging device according to Embodiment 2 of the present invention.

FIG. 21 is a flowchart showing the temperature estimation performed by the imaging device 101 according to Embodiment 2 of the present invention.

Initially, the temperature estimation unit 143 extracts a horizontal midsection imaging signal from the imaging signal I0 (Step S1320).

Figure 22:
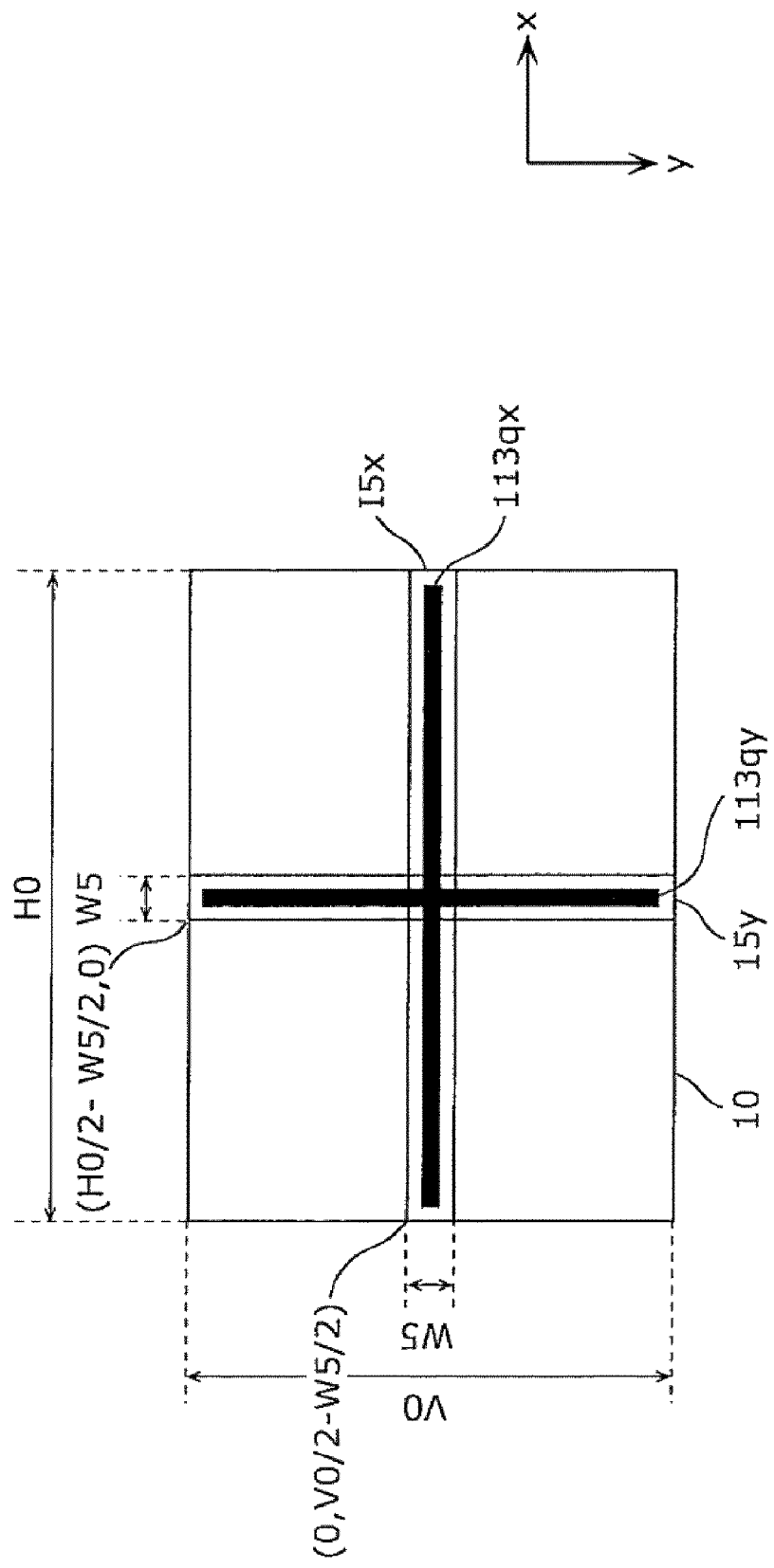
FIG. 22 is an explanatory diagram of dark sections and positions at which imaging signals corresponding to a light-shielding wall are extracted from an imaging signal of an imaging device according to Embodiment 2 of the present invention.

FIG. 22 is an explanatory diagram of dark sections and positions at which imaging signals corresponding to the light-shielding wall are extracted from the imaging signal of the imaging device 101 according to Embodiment 2 of the present invention.

As shown in FIG. 22, the temperature estimation unit 143 extracts a horizontal midsection imaging signal I5x and a vertical midsection imaging signal I5y in such a manner that they surround dark sections 113qx and 113qy corresponding to the light-shielding wall 113. More specifically, as the horizontal midsection imaging signal I5x, the temperature estimation unit 143 treats the imaging signal of an area extracted along H0 pixel(s) in the x-axial direction and W5 pixel(s) In the y-axial direction from the origin point (0, V0/2−W5/2).

Next, the temperature estimation unit 143 extracts the vertical midsection imaging signal from the imaging signal I0 (Step S1330). More specifically, as the vertical midsection imaging signal I5y, the temperature estimation unit 143 treats the imaging signal of an area extracted along W5 pixel(s) in the x-axial direction and V0 pixel(s) in the y-axial direction from the origin point (H0/2−W5/2, 0) as shown in FIG. 22.

Next, the temperature estimation unit 143 detects, from the extracted horizontal midsection imaging signal I5x, the horizontal length Qx of the dark section 113qx (Step S1340). To be more specific, the temperature estimation unit 143 binarizes the horizontal midsection imaging signal I5x, and detects the length from the left end to the right end of the dark section, using the binarized imaging signal.

Next, the temperature estimation unit 143 detects, from the extracted vertical midsection imaging signal I5y, the vertical length Qy of the dark section 113qy (Step S1350). To be more specific, the temperature estimation unit 143 binarizes the vertical midsection imaging signal I5y, and detects the length from the top to the bottom of the dark section, using the binarized imaging signal.

Next, the temperature estimation unit 143 calculates an estimate temperature Te (Step S1360). More specifically, the temperature estimation unit 143 calculates an estimate temperature Te by substituting, in Equation (9), the horizontal length Qx of the dark section 113qx detected in Step S1340 and the vertical length Qy of the dark section 113qy detected in Step S1350.

Here, the values stored in the storing unit 146 are used for the reference temperature T0, the linear thermal expansion coefficient kq of the light-shielding wall 113, the horizontal length Qx0 of the dark section 113qx at the reference temperature T0, and the vertical length Qy0 of the dark section 113qy at the reference temperature T0.

As described thus far, with the use of the temperature estimated by the temperature estimation unit 143 based on the lengths of the image of the light-shielding wall 113, the imaging device 101 according to Embodiment 2 of the present invention is capable of obtaining the thermal sensor signal reliability value by digitalizing the reliability of the temperature detected by the thermal sensor 124. It follows that the notification unit 145 notifies, for example, that the reliability is low based on the obtained thermal sensor signal reliability value, so that the user can avoid using the imaging device having a defect and so on.

To be more specific, the user can avoid using the imaging device having: aged deterioration of the thermal sensor 124; a breakdown of the thermal sensor 124; a break in the wire of the thermal sensor 124 and the SLSI 123; a break in the thermal sensor signal line inside the SLSI 123; missing bit caused by a breakdown of the ADC of the thermal sensor signal input unit 134; a drop in the reference voltage applied to the ADC of the thermal sensor signal input unit 134 caused by an increased load due to a breakdown of other components; mixing of noise into the wire from the thermal sensor 124 to the SLSI 123; mixing of noise into the thermal sensor signal line inside the SLSI 123; and so on.

That is to say, the imaging device of the present embodiment can increase its reliability.

As described, the imaging device, the reliability of which would conventionally need to be increased by adding another thermal sensor, can provide higher reliability without an additional thermal sensor. Further, since the imaging device according to the present embodiment does not require an additional thermal sensor, it is possible to prevent increase in the manufacturing cost and to miniaturize the imaging device.

Furthermore, the imaging device 101 can calculate the distance to the object by performing temperature compensation using the temperature of the thermal sensor 124, the reliability of which has been evaluated. That is to say, provision of highly reliable distance information is possible without an additional thermal sensor. In addition, according to the imaging device of the present embodiment, it is possible to provide an imaging device which is highly tolerant to external noise, that is, a rugged imaging device, because the thermal sensor signal reliability value Tsr is calculated using: the thermal sensor signal Ts which may contain an error due to reference voltage fluctuations; and the estimate temperature Te calculated from the lengths of the dark sections that are not affected by variation in the image luminance caused by reference voltage fluctuations.

In the present embodiment, the temperature compensation operation unit 141 performs temperature compensation by calculating the coordinate conversion tables tx1, ty1, tx2, ty2, tx3, ty3, tx4, and ty4; however, it may perform different temperature compensation. For example, the temperature compensation operation unit 141 may perform temperature compensation by subtracting, from the disparity calculated by the distance calculation unit 142, the amount of change in the spacing between the optical axes of the lenses in the lens array 112 as shown in Equation (52).

Alternatively, the temperature compensation operation unit 141 may perform temperature compensation by correcting, as shown in Equation (53), the distance DIS (x, y) calculated by the distance calculation unit 142.

[Math. 19]

$$\Delta(ih, iv) = \Delta(ih, iv) - ddx \quad (52)$$

$$DIS(x, y) = DIS(x, y) \times \frac{1}{1 - \frac{DIS(x, y) \times p \times ddx}{f \times Dx}} \quad (53)$$

Further, in the present embodiment, the thermal sensor signal reliability calculation unit 144 calculates the thermal sensor signal reliability value Tsr based on a difference between two temperatures (the thermal sensor signal Ts and the estimate temperature Te); however, the thermal sensor signal reliability value Tsr may be calculated based on a ratio of the two temperatures. More specifically, the thermal sensor signal reliability value Tsr may be calculated such that the reliability of the thermal sensor signal Ts is lower when the degree of match between the two temperatures is lower. In such a case of calculating the thermal sensor signal reliability value based on a ratio of the two temperatures, the notification unit 145 sets the notification data DDE to 0 when the thermal sensor signal reliability value falls within a predetermined value range including 1. On the other hand, the notification unit 145 sets the notification data DDE to 1 when the thermal sensor signal reliability value falls outside the predetermined value range including 1.

(Embodiment 3)

An imaging system according to Embodiment 3 of the present invention is a system using the imaging device 101 according to Embodiment 2.

Hereinafter, an imaging system 202 according to Embodiment 3 of the present invention is described with reference to the drawings.

Figure 23:
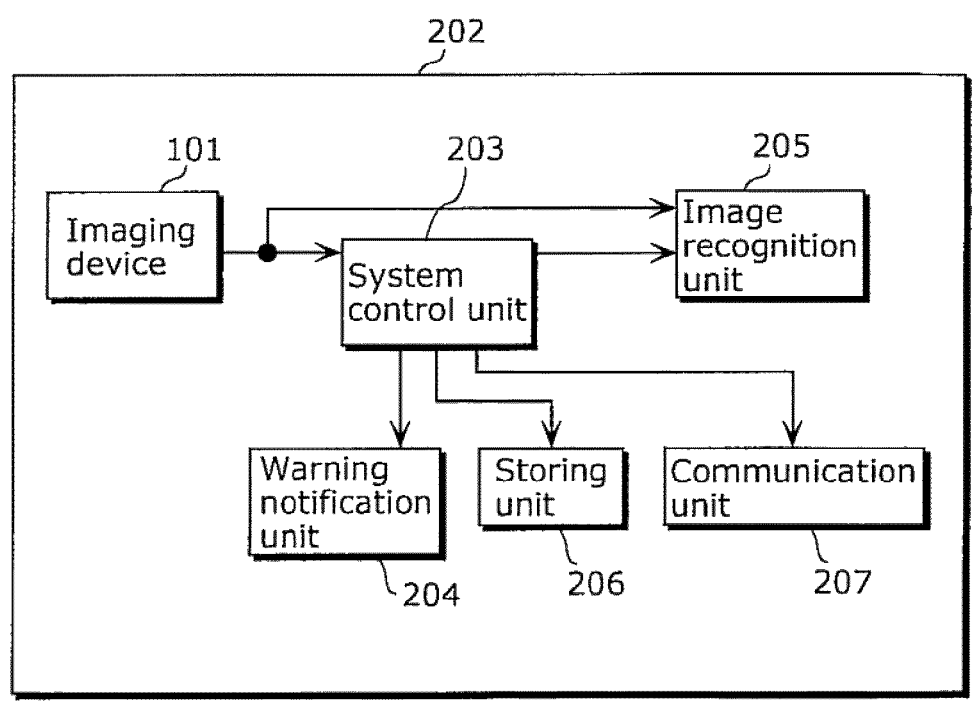
FIG. 23 is a block diagram showing the structure of an imaging system according to Embodiment 3 of the present invention.

FIG. 23 is a block diagram showing the structure of an imaging system 202 according to Embodiment 3 of the present invention.

As shown in FIG. 23, the imaging system 202 includes the imaging device 101 of Embodiment 2, a system control unit 203, a warning notification unit 204, an image recognition unit 205, a storing unit 206, and a communication unit 207.

The system control unit 203 includes a CPU, for example, and controls each function of the imaging system 202.

The imaging device 101 is the imaging device of Embodiment 2, and is controlled by the system control unit 203. The imaging device 101 outputs image data (the first imaging signal I1, for example), distance data DIS, and a thermal sensor signal reliability value Tsr.

The warning notification unit 204 includes a red LED and a driving circuit, for example. The system control unit 203 turns off the light of the LED in the warning notification unit 204 when the reliability is determined to be high based on the thermal sensor signal reliability value Tsr (for example, when the thermal sensor signal reliability value Tsr is below a set value Tsr0). On the other hand, the system control unit 203 turns on the light of the LED in the warning notification unit 204 when the reliability is determined to be low based on the thermal sensor signal reliability value Tsr (for example, when the thermal sensor signal reliability value Tsr is equal to or greater than the set value Tsr0).

This allows the user to know the reliability of the thermal sensor signal of the imaging device 101. As a result, the user can take an action accordingly, such as stop using the device or report the situation to the manufacturing company, thereby suppressing a damage caused by a defect of the imaging system 202.

The image recognition unit 205 includes a CPU, for example. The system control unit 203 sends the image recognition unit 205 an instruction regarding an image recognition method, based on the thermal sensor signal reliability value Tsr. The image recognition unit 205 performs image recognition using image data I1 and distance DIS when the reliability is determined to be high based on the thermal sensor signal reliability value Tsr (for example, when the thermal sensor signal reliability value Tsr is below the set value Tsr0). On the other hand, the image recognition unit 205 performs image recognition without using the distance DIS but using only the image data I1 when the reliability is determined to be low based on the thermal sensor signal reliability value Tsr (for example, when the thermal sensor signal reliability value Tsr is equal to or greater than the set value Tsr0).

In such a manner, the image recognition unit 205 performs image recognition without using, for example, the distance DIS when the reliability is determined to be low based on the thermal sensor signal reliability value Tsr, thereby preventing impact caused by a defect in the thermal sensor.

The storing unit 206 includes, for example, a nonvolatile memory such as a flash ROM. The system control unit 203 writes a time and the thermal sensor signal reliability value Tsr into the storing unit 206 when the reliability is determined to be low based on the thermal sensor signal reliability value Tsr (for example, when the thermal sensor signal reliability value Tsr is equal to or greater than the set value Tsr0).

This allows one to check time-series information of the written thermal sensor signal reliability value Tsr, thereby making it possible to appropriately determine the time of replacing the thermal sensor, for example.

The communication unit 207 includes a wireless communication apparatus and an antenna, for example. The system control unit 203 reports a defect in the thermal sensor to a management company, for example, via the communication unit 207 when the reliability is determined to be low based on the thermal sensor signal reliability value Tsr (for example, when the thermal sensor signal reliability value Tsr is equal to or greater than the set value Tsr0).

This makes it possible for the management company, for example, to detect the defect in the thermal sensor, dispatch management personnel, provide information to the users, make arrangements for components of the thermal sensor, and so on. As a result, the defect in the imaging system 202 can be resolved at an early stage.

As described thus far, according to the imaging system 202 according to Embodiment 3 of the present invention, it is possible to change the method for processing, such as the image processing, based on the thermal sensor signal reliability value obtained from the imaging device 101. That is to say, the imaging system 202 can prevent the impact caused by a defect in the thermal sensor.

(Variation)

The imaging device according to a variation of the present invention increases the precision of detecting the lengths of the image of the light-shielding wall, through a change in the shapes of the light-shielding wall and the lens tube of the imaging device according to the above embodiments.

Hereinafter, the lens tube 111 and the light-shielding wall 113 according to the variation of the present invention are described with reference to the drawings.

Figure 24:
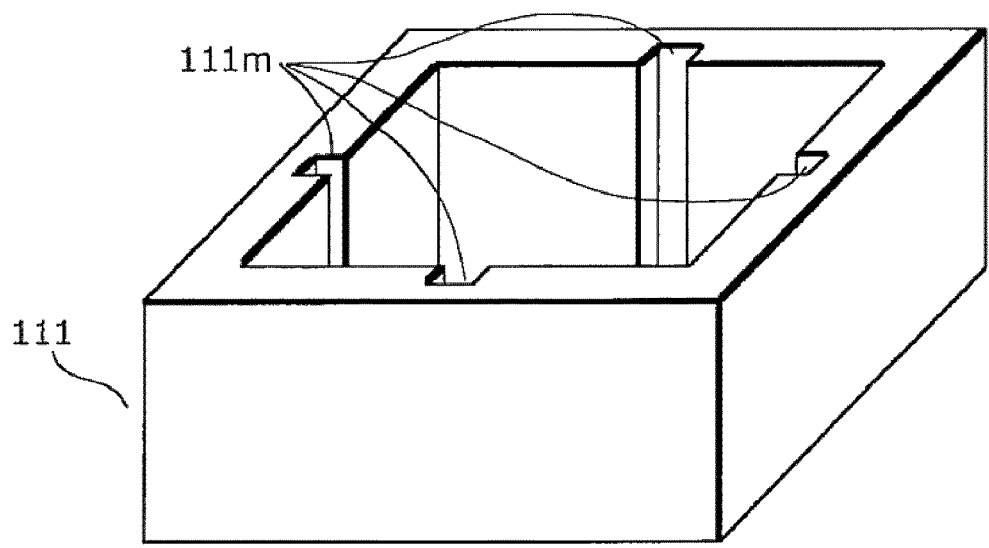
FIG. 24 is a perspective view of a lens tube according to a variation of the present invention.
Figure 25A:
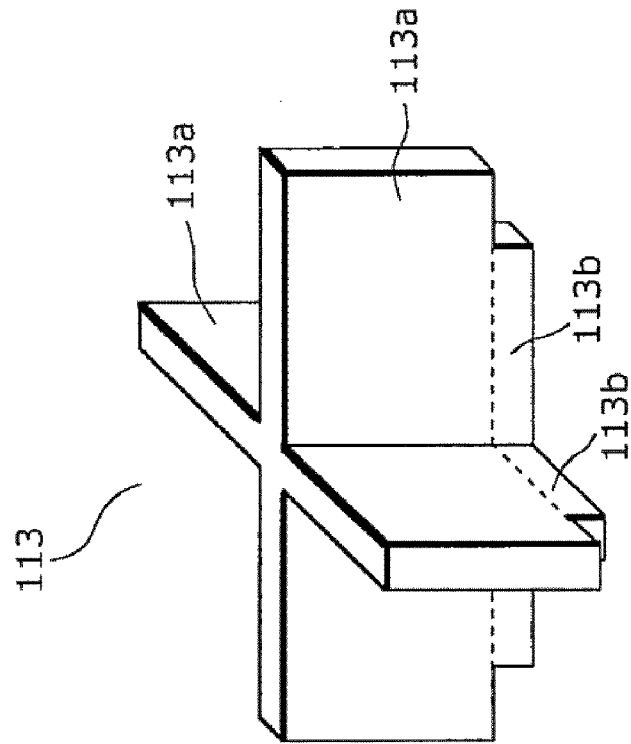
FIG. 25A is a perspective view of a light-shielding wall according to a variation of the present invention.
Figure 25B:
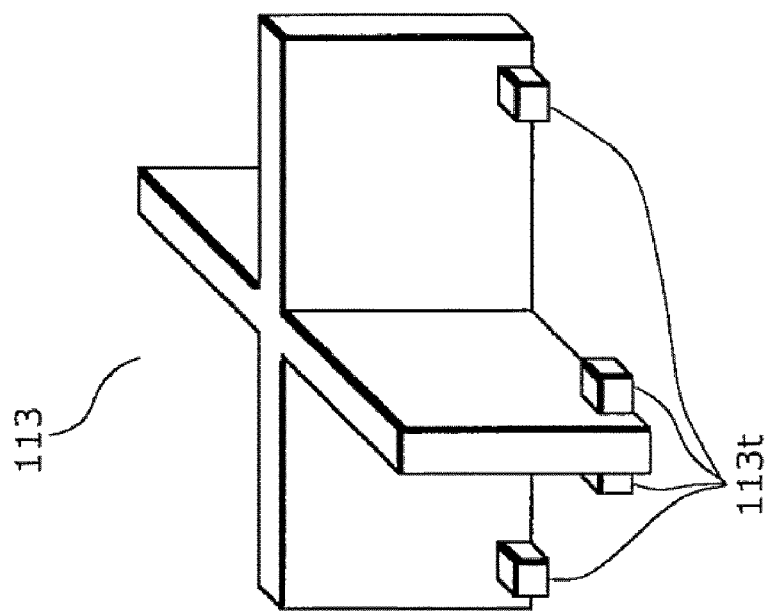
FIG. 25B is a perspective view of a light-shielding wall according to a variation of the present invention.
Figure 26A:
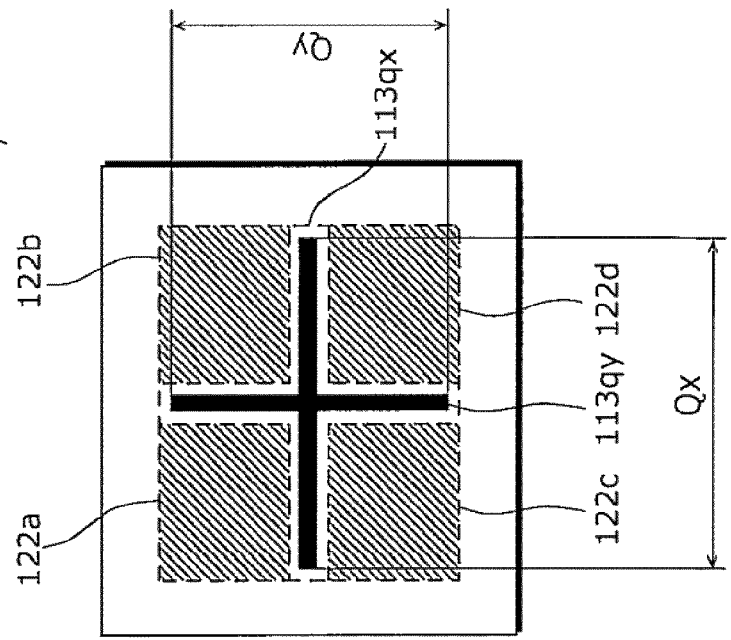
FIG. 26A is an explanatory diagram of an image of a light-shielding wall according to a variation of the present invention.
Figure 26B:
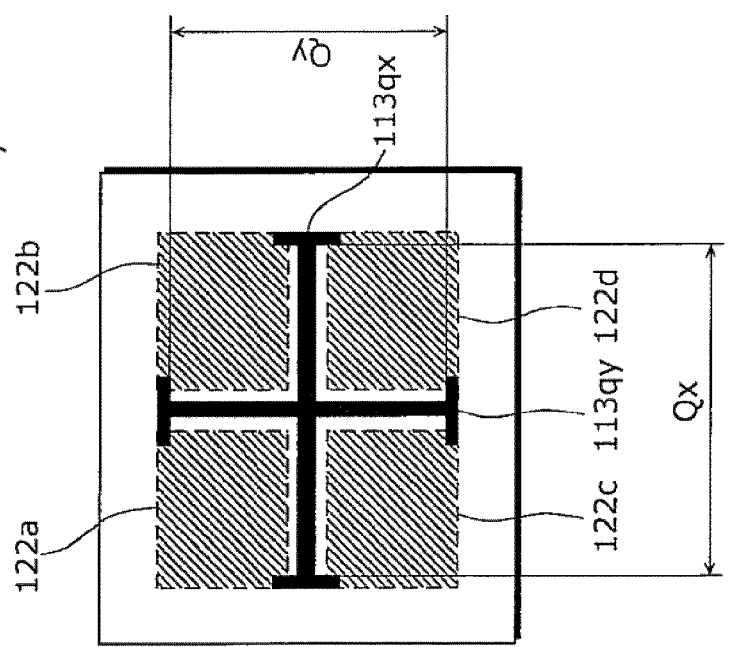
FIG. 26B is an explanatory diagram of an image of a light-shielding wall according to a variation of the present invention.

FIG. 24 is a perspective view of the lens tube 111 according to the variation of the present invention. FIGS. 25A and 25B are perspective views of the light-shielding wall 113 according to the variation of the present invention. FIGS. 26A and 26B are explanatory diagrams of the image of the light-shielding wall 113 according to the variation of the present invention.

As shown in FIG. 24, the lens tube 111 according to the present variation has four grooves 111m into which the light-shielding wall 113 can be fitted. Each of the light-shielding walls 113 shown in FIGS. 25A and 25B is fixed by being fitted into the grooves 111m.

FIG. 25A shows an example of the light-shielding wall 113 according to the variation. As shown in FIG. 25A, the light-shielding wall 113 has protruding portions 113t at its lower part.

Although the light-shielding wall 113 according to the present variation has the protruding portions 113t on both sides of the plates, it may have the protruding portions 113t only on one side.

FIG. 26A shows an image of the light-shielding wall 113 shown in FIG. 25A. As shown in FIG. 26A, the temperature estimation unit estimates the temperature using the lengths Qx and Qy of the image of the light-shielding wall 113 between the protruding portions 113t.

It is to be noted that in the case where an image is taken using a lens having barrel distortion, the corners of the image become unnecessary parts as a result of distortion correction. That is to say, although the images of the protruding portions are partially included in four imaging signals (the first imaging signal 122a, the second imaging signal 122b, the third imaging signal 122c, and the fourth imaging signal 122d), the unnecessary parts of the imaging signals are used for the protruding portions.

The light-shielding wall 113 may have a shape shown in FIG. 25B.

FIG. 25B shows an example of the light-shielding wall 113 according to the variation. As shown in FIG. 25B, each plate of the light-shielding wall 113 has a first plate portion 113a at its upper part and a second plate portion 113b at its lower part. The first plate portion 113a and the second plate portion 113b are formed in one piece.

FIG. 26B shows an image of the light-shielding wall 113 shown in FIG. 25B. As shown in FIG. 26B, the temperature estimation unit estimates the temperature using the lengths Qx and Qy of the image of the second plate portion 113b of the light-shielding wall 113.

As described, the light-shielding wall 113 can be stably held by being fixed using the grooves 111m of the lens tube 111. In the case where the light-shielding wall 113 and the lens tube 111 are made of is the same material, they deform in the same manner upon a temperature variation. That is to say, the temperature estimation becomes more precise than in the case where the light-shielding wall 113 is bonded to the lens array.

In addition, since the light-shielding wall 113 has the protruding portions 113t or the second plate portion 113b, the detection of the dark section lengths is facilitated and the precision of such detection increases. That is to say, the precision of the temperature estimation increases.

Although some embodiments and a variation of the imaging device and the imaging system according to an aspect of the present invention have been described above, the present invention is not limited to these embodiments and the variation. Those skilled in the art will appreciate that: many modifications are possible in the above embodiments and variation; and that combined embodiments are possible using the constituent elements of different embodiments and variation, without materially departing from the novel teachings and advantages of the present invention. Accordingly, all such modifications are intended to be included within the scope of the present invention.

For example, although the lens array 112 in the imaging device according to an aspect of the present invention has four lenses (the first lens 112a, the second lens 112b, the third lens 112c, and the fourth lens 112d), the number of lenses is not limited to four. Hereinafter, a specific example of the case of changing the number of lenses is described with reference to the drawings.

Figure 27B:
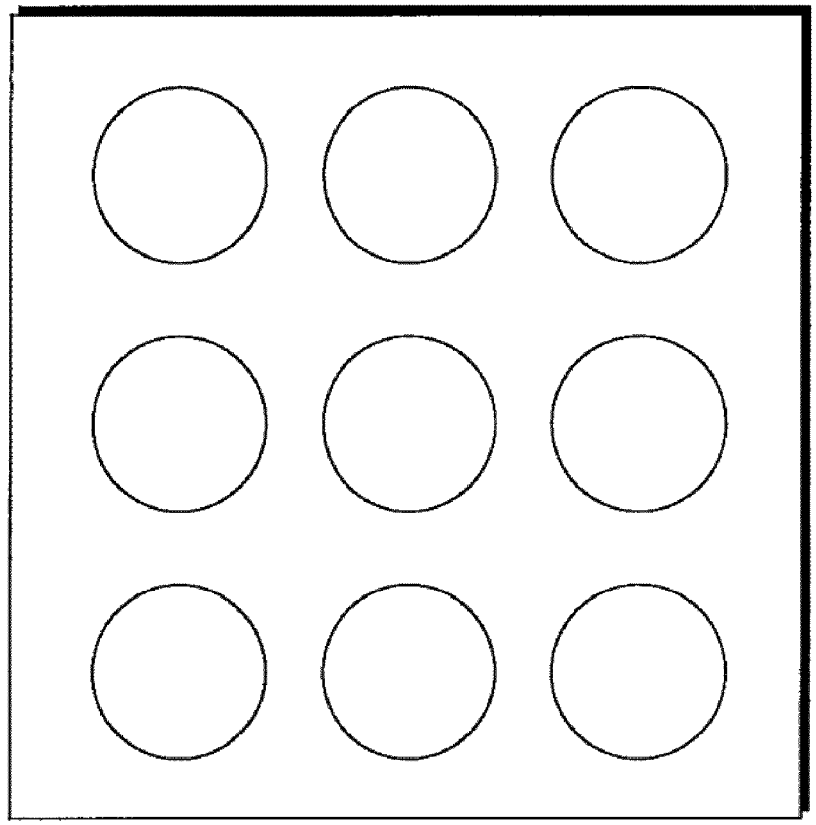
FIG. 27B is a plan view of lenses of an imaging device according to an aspect of the present invention.
Figure 27A:
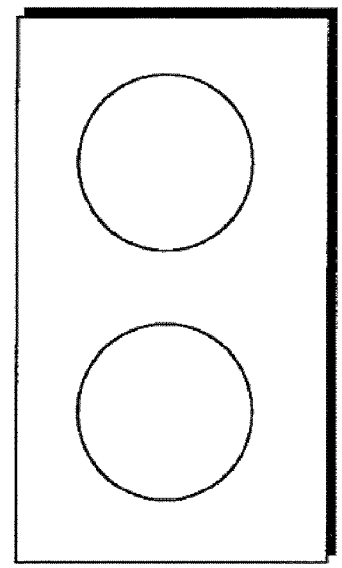
FIG. 27A is a plan view of lenses of an imaging device according to an aspect of the present invention.
Figure 28B:
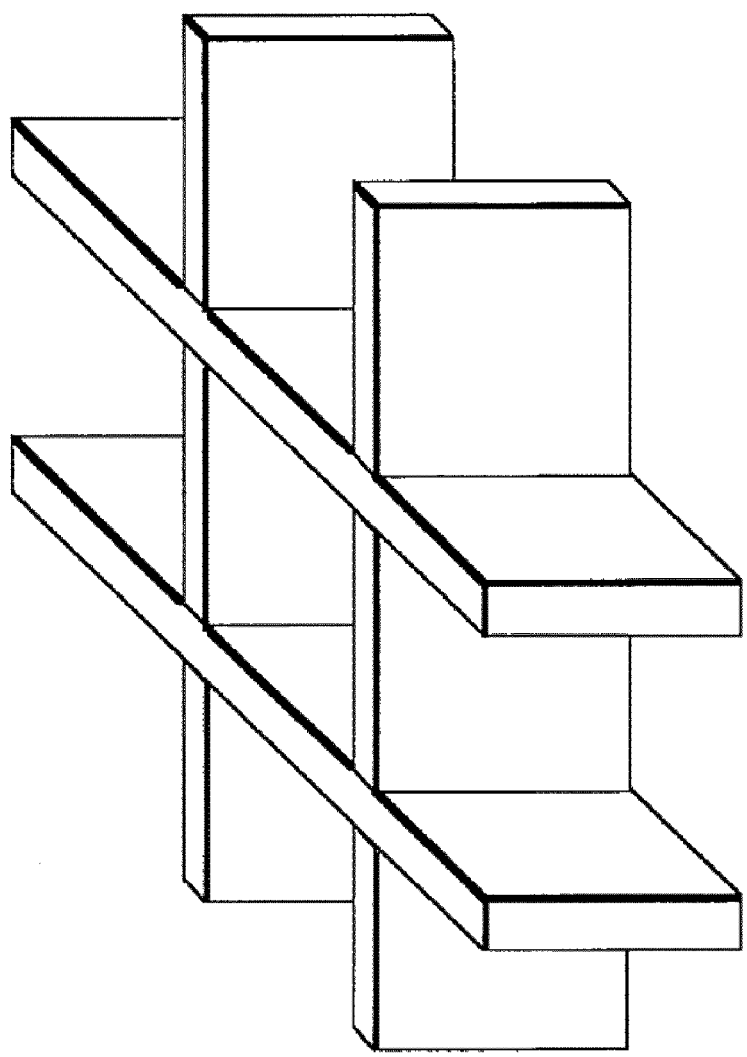
FIG. 28B is a perspective view of a light-shielding wall of an imaging device according to an aspect of the present invention.
Figure 28A:
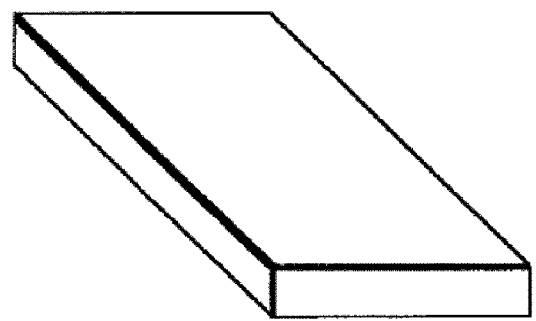
FIG. 28A is a perspective view of a light-shielding wall of an imaging device according to an aspect of the present invention.
Figure 30:
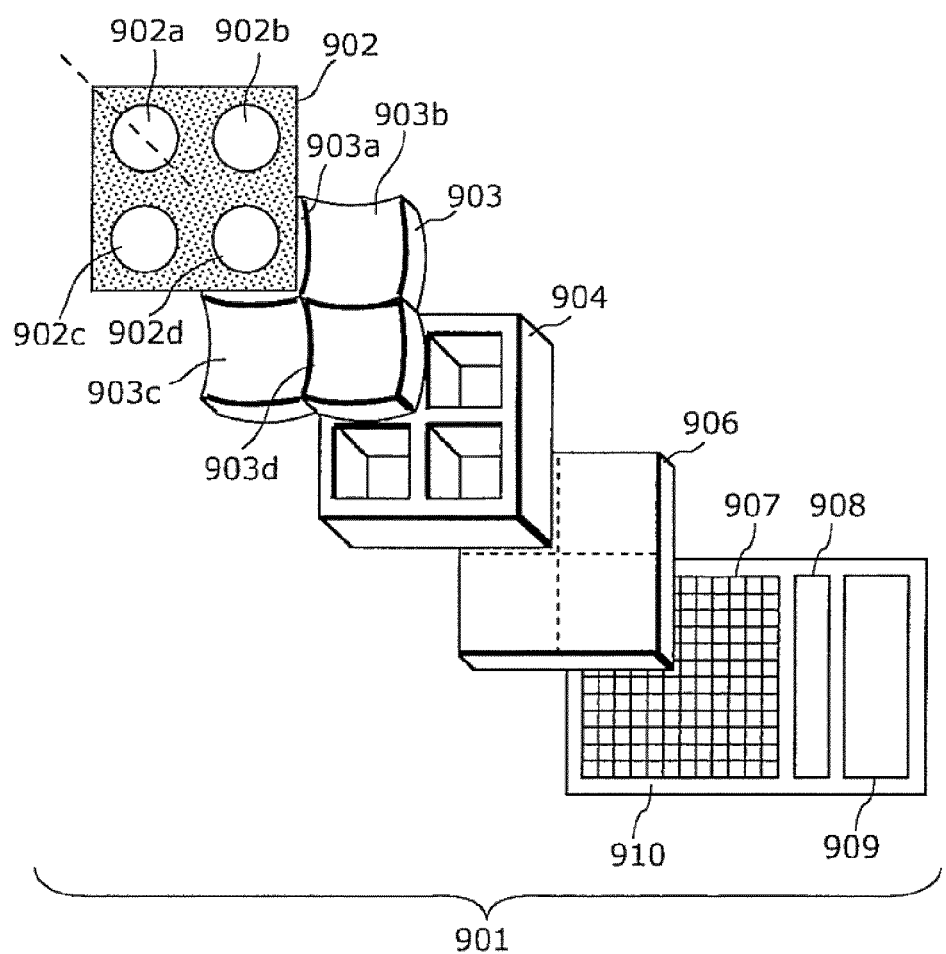
FIG. 30 is an exploded perspective view of a conventional imaging device.
Figure 31:
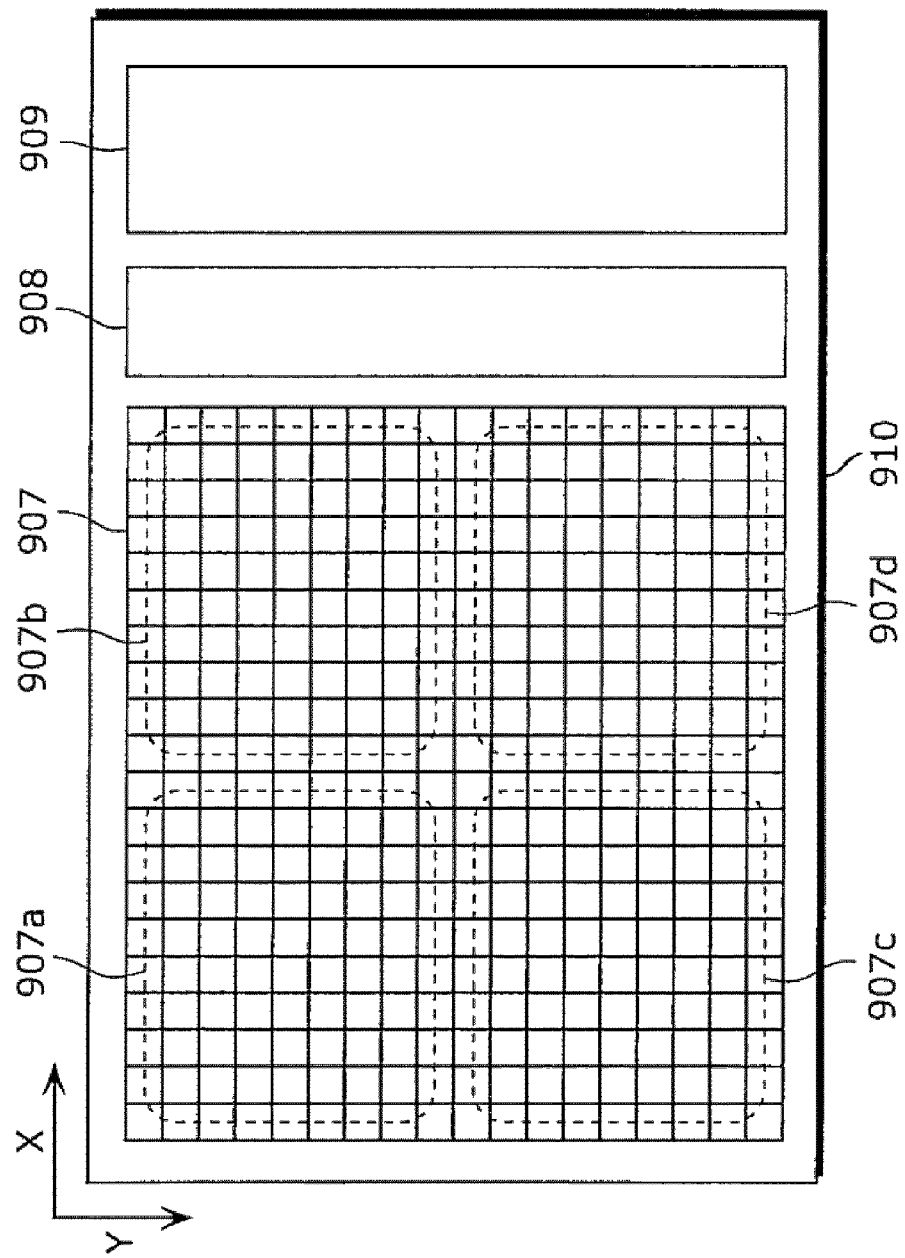
FIG. 31 is an explanatory diagram of imaging blocks of a conventional imaging device.

FIGS. 27A and 27B are plan views of the lenses of the imaging device according to an aspect of the present invention. FIGS. 28A and 28B are perspective views of the light-shielding wall of the imaging device according to an aspect of the present invention. FIGS. 29A and 29B show imaging signals of the light-shielding wall according to an aspect of the present invention.

For example, as shown in FIG. 27A, the lens array of the imaging device may include two lenses. In this case, as shown in FIG. 28A, the light-shielding wall is one piece of plate for preventing the light entering the two lenses from interfering one another.

The image of the light-shielding wall shown in FIG. 28A is the dark section in FIG. 29A. Here, given that the imaging signal of the section surrounding the image of the light-shielding wall is a vertical midsection imaging signal I5y, the temperature estimation unit detects, from the vertical midsection imaging signal I5y, the length Qy of the dark section corresponding to the light-shielding wall. Then, the temperature estimation unit calculates an estimate temperature Te based on the detected length Qy using Equation (54).

[Math. 20]

$$Te = T0 + \frac{1}{kq} \frac{Qy - Qy0}{Qy0} \tag{54}$$

Further, as shown in FIG. 27B, the lens array of the imaging device may include nine lenses, for example. In this case, as shown in FIG. 28B, the light-shielding wall includes plates that are assembled in a shape of # for preventing the light entering the nine lenses from interfering one another.

The image of the light-shielding wall shown in FIG. 28B is the dark sections in FIG. 29B. Here, given that the imaging signals of the sections surrounding the image of the light-shielding wall are a first horizontal midsection imaging signal I5x1, a second horizontal midsection imaging signal I5x2, a first vertical midsection imaging signal I5y1, and a second vertical midsection imaging signal I5y2, the temperature estimation unit detects, from the four midsection imaging signals, the lengths Qx1, Qx2, Qy1, and Qy2 of the corresponding dark sections of the light-shielding wall. Then, the temperature estimation unit calculates an estimate temperature Te based on the detected lengths Qx1, Qx2, Qy1, and Qy2 using Equation (55).

[Math. 21]

$$Te = T0 + \frac{1}{4kq}\left(\frac{Qx1 - Qx10}{Qx10} + \frac{Qx2 - Qx20}{Qx20} + \frac{Qy1 - Qy10}{Qy10} + \frac{Qy2 - Qy20}{Qy20}\right) \quad (55)$$

Here, Qx10 is the length of the dark section of the first horizontal midsection imaging signal I5x1 at the reference temperature T0. Qx20 is the length of the dark section of the second horizontal midsection imaging signal I5x2 at the reference temperature T0. Qy10 is the length of the dark section of the first vertical midsection imaging signal I5y1 at the reference temperature T0. Qy20 is the length of the dark section of the second vertical midsection imaging signal I5y2 at the reference temperature T0.

[Industrial Applicability]

The imaging device according to an aspect of the present invention can be used as a mobile phone having a camera function, a digital still camera, an in-vehicle camera, a monitoring camera, a three-dimensional measuring instrument, a stereoscopic image camera, for example, as an imaging device capable of temperature measurement. Further, the imaging system according to an aspect of the present invention can be used as a mobile phone, a digital still camera, a vehicle, a monitoring system, a three-dimensional measuring instrument, a stereoscopic image system, for example, as an imaging system capable of measuring the distance to the object.

Reference Signs List 101, 101 Imaging device
110 Lens module
111 Lens tube
112 Lens array
113 Light-shielding well
120 Circuit unit
121 Substrate
122 Imaging element
123 SLSI
124 Thermal sensor
125 Gold wire
131 System control unit
132 Imaging element driving unit
133 Imaging signal input unit
134 Thermal sensor signal input unit
135 Input-output unit
141 Temperature compensation operation unit
142 Distance calculation unit
143 Temperature estimation unit
144 Thermal sensor signal reliability calculation unit
145 Notification unit
146, 206 Storing unit
202 Imaging system
203 System control unit
204 Warning notification unit
205 Image recognition unit
207 Communication unit 207

The invention claimed is:

1. An imaging device for taking an image of an object, said imaging device comprising:
a lens array including a plurality of lenses;
an imaging element provided at a predetermined distance from said lens array and having a plurality of imaging areas respectively corresponding to said plurality of lenses;
a light-shielding wall which partitions a space between said lens array and said imaging element so as to prevent light entering each of said plurality of lenses from reaching said plurality of imaging areas different from a corresponding one of said plurality of imaging areas;
an imaging signal input unit configured to generate an imaging signal by digitalizing an electric signal provided by said imaging element; and
a temperature estimation unit configured to calculate, from the imaging signal, a length of an image of said light-shielding wall projected on an imaging plane of said imaging element, and to estimate a first temperature using the calculated length of the image of said light-shielding wall.

2. The imaging device according to claim 1, further comprising:
a thermal sensor which is provided near said lens array and detects a second temperature; and
a reliability calculation unit configured to calculate a reliability value of the second temperature based on the first temperature and the second temperature.

3. The imaging device according to claim 2,
wherein said reliability calculation unit is configured to calculate the reliability value such that a reliability of the second temperature is lower when a difference between the first temperature and the second temperature is larger.

4. The imaging device according to claim 2, further comprising:
a temperature compensation operation unit configured to estimate an amount of change in distance between optical axes of said plurality of lenses caused by a change in temperature from a predetermined temperature to the second temperature, and to correct, using the estimated amount of change, data obtained from the imaging signal; and
a distance calculation unit configured to calculate a disparity between images taken on said plurality of imaging areas, and a distance to the object using the data corrected by said temperature compensation operation unit.

5. The imaging device according to claim 2, further comprising
a notification unit configured to generate notification data for external notification when a reliability of the second temperature is determined to be low because the reliability value calculated by said reliability calculation unit exceeds a predetermined value.

6. The imaging device according to claim 1, further comprising
a lens tube of a tubular shape provided between said lens array and said imaging element to surround said light-shielding wall, wherein said lens tube includes at least a pair of grooves in an inner surface,
wherein said light-shielding wall is a platy member of a rectangular shape extending in a direction from the imaging plane of said imaging element to said lens array, and includes side edges fitted into said grooves of said lens tube so as to set said light-shielding wall in place, and at least two protruding portions protruding from a same plate surface of said platy member, and wherein said temperature estimation unit is configured to estimate the first temperature using a length of an image between said protruding portions.

7. The imaging device according to claim 1, further comprising
a lens tube of a tubular shape provided between said lens array and said imaging element to surround said light-shielding wall, wherein said lens tube includes at least a pair of grooves in an inner surface,
wherein said light-shielding wall is a platy member extending in a direction from the imaging plane of said imaging element to said lens array, and includes a first plate portion having side edges fitted into said grooves of said lens tube, and a second plate portion protruding from said first plate portion toward the imaging plane, and
wherein said temperature estimation unit is configured to estimate the first temperature using a length of an image of said second plate portion.

8. An imaging system comprising:
said imaging device according to claim 4; and
a system control unit configured to perform predetermined control based on the distance to the object and the reliability value which are calculated by said imaging device.

9. An imaging method for use in an imaging device, wherein the imaging device includes:
a lens array including a plurality of lenses;
an imaging element provided at a predetermined distance from the lens array and having a plurality of imaging areas respectively corresponding to the plurality of lenses; and
a light-shielding wall which partitions a space between the lens array and the imaging element so as to prevent light entering each of the plurality of lenses from reaching the plurality of imaging areas different from a corresponding one of the plurality of imaging areas, and
said imaging method comprises:
generating an imaging signal by digitalizing an electric signal provided by the imaging element; and
calculating, from the imaging signal, a length of an image of the light-shielding wall projected on an imaging plane of the imaging element, and estimating a temperature using the calculated length of the image of the light-shielding wall.

10. A non-transitory computer-readable medium having a computer program recorded thereon for execution by an imaging device,
wherein the imaging device includes:
a lens array including a plurality of lenses;
an imaging element provided at a predetermined distance from the lens array and having a plurality of imaging areas respectively corresponding to the plurality of lenses; and
a light-shielding wall which partitions a space between the lens array and the imaging element so as to prevent light entering each of the plurality of lenses from reaching the plurality of imaging areas different from a corresponding one of the plurality of imaging areas, and
said program, when executed, causes the imaging device to perform an imaging method comprising:
generating an imaging signal by digitalizing an electric signal provided by the imaging element; and
calculating, from the imaging signal, a length of an image of the light-shielding wall projected on an imaging plane of the imaging element, and estimating a temperature using the calculated length of the image of the light-shielding wall.

* * * * *